(12) United States Patent
Amano et al.

(10) Patent No.: US 10,688,658 B2
(45) Date of Patent: Jun. 23, 2020

(54) METHOD OF CONTROLLING HOLDING APPARATUS, HOLDING APPARATUS, AND ROBOT APPARATUS

(71) Applicant: CANON KABUSHIKI KAISHA, Tokyo (JP)

(72) Inventors: Shingo Amano, Kawasaki (JP); Isamu Okuma, Inagi (JP); Masamichi Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 15/693,970

(22) Filed: Sep. 1, 2017

(65) Prior Publication Data

US 2018/0126551 A1 May 10, 2018

(30) Foreign Application Priority Data

Nov. 10, 2016 (JP) ................. 2016-219936
Dec. 7, 2016 (JP) ................. 2016-237183

(51) Int. Cl.
*G06F 19/00* (2018.01)
*B25J 9/16* (2006.01)
(Continued)

(52) U.S. Cl.
CPC ........... *B25J 9/1633* (2013.01); *B25J 9/1612* (2013.01); *B25J 9/1641* (2013.01); *B25J 13/085* (2013.01);
(Continued)

(58) Field of Classification Search
CPC ........ B25J 9/1633; B25J 9/1612; B25J 15/10; B25J 13/085; B25J 9/1641; B25J 15/08;
(Continued)

(56) References Cited

U.S. PATENT DOCUMENTS 7,168,748 B2 * 1/2007 Townsend ............ B25J 9/1612
294/106
7,549,688 B2 * 6/2009 Hayakawa ........... B25J 13/085
294/106
(Continued)

FOREIGN PATENT DOCUMENTS

EP      0 358 966      3/1990
JP      2010-069584 A  4/2010
(Continued)

OTHER PUBLICATIONS

U.S. Appl. No. 15/546,250, filed Jul. 25, 2017. Applicant: Isamu Okuma.
(Continued)

*Primary Examiner* — Ian Jen
(74) *Attorney, Agent, or Firm* — Venable LLP

(57) ABSTRACT

A method of controlling a holding apparatus configured to hold plural kinds of target objects by plural fingers in plural relative postures includes calculating, on a basis of information about holding force of the fingers in a relative posture for a target object, an amount of positional deviation of the target object held by the fingers, and correcting, on a basis of the amount of positional deviation calculated in the calculating, a position of the target object held by the fingers.

16 Claims, 17 Drawing Sheets

(51) Int. Cl.
*B25J 13/08* (2006.01)
*B25J 15/08* (2006.01)
*B25J 15/10* (2006.01)

(52) U.S. Cl.
CPC ............... *B25J 15/08* (2013.01); *B25J 15/10* (2013.01); *G05B 2219/39478* (2013.01); *G05B 2219/39486* (2013.01); *G05B 2219/40144* (2013.01)

(58) Field of Classification Search
CPC ........... G05B 2219/39486; G05B 2219/39478; G05B 2219/40144
See application file for complete search history.

(56) References Cited

U.S. PATENT DOCUMENTS

| | | | | |
|---|---|---|---|---|
| 8,052,185 | B2 * | 11/2011 | Madhani | B25J 15/0009 294/106 |
| 8,463,434 | B2 * | 6/2013 | Takahashi | B25J 9/1612 318/568.16 |
| 8,549,952 | B2 * | 10/2013 | Matsukuma | B25J 9/104 294/104 |
| 8,641,115 | B2 * | 2/2014 | Kim | B25J 15/083 294/106 |
| 8,672,378 | B2 * | 3/2014 | Yamasaki | B25J 15/0009 294/198 |
| 8,801,063 | B2 | 8/2014 | Nammoto et al. | |
| 8,833,826 | B2 * | 9/2014 | Garcia | B25J 15/0009 294/111 |
| 8,909,376 | B2 * | 12/2014 | Moon | B25J 9/1612 700/260 |
| 8,991,885 | B2 * | 3/2015 | Claffee | B25J 9/0015 294/111 |
| 9,248,575 | B2 * | 2/2016 | Miyazawa | B25J 15/0009 |
| 9,517,560 | B2 | 12/2016 | Amano | |
| 9,539,728 | B2 * | 1/2017 | Nammoto | B25J 15/0009 |
| 9,616,580 | B2 * | 4/2017 | Smith | B25J 15/0475 |
| 9,669,545 | B2 | 6/2017 | Suzuki et al. | |
| 2011/0040408 | A1 * | 2/2011 | De La Rosa Tames | B25J 9/1045 700/258 |
| 2012/0022690 | A1 * | 1/2012 | Ooga | B25J 9/1633 700/258 |
| 2013/0183129 | A1 * | 7/2013 | Nammoto | B25J 15/10 414/729 |
| 2015/0025683 | A1 * | 1/2015 | Amano | B25J 9/1692 700/254 |
| 2015/0028613 | A1 * | 1/2015 | Nakayama | B25J 15/0206 294/196 |
| 2016/0121489 | A1 * | 5/2016 | Moore | B25J 15/0009 294/198 |
| 2017/0217020 | A1 | 8/2017 | Suzuki et al. | |
| 2018/0126551 | A1 * | 5/2018 | Amano | B25J 13/085 |

FOREIGN PATENT DOCUMENTS

| | | |
|---|---|---|
| JP | 2013-146798 A | 8/2013 |
| JP | 2013-255981 A | 12/2013 |

OTHER PUBLICATIONS

Namiki, A., et al., Development of a High-speed Multifingered Hand System and Its Application to Catching. Proceedings of the 2003 IEEE/RSJ Intl. Conference on intelligent Robots and Systems, Las Vegas, Nevada, Oct. 27, 2003, pp. 2666-2671.

Odhner, L. et al., "A compliant, underactuated hand for robust manipulation", The International Journal of Robotics Research Feb. 17, 2014, vol. 33, No. 5, pp. 736-752.

European Search Report issued Sep. 6, 2018 during prosecution of related European application No. 17188539.5.

* cited by examiner

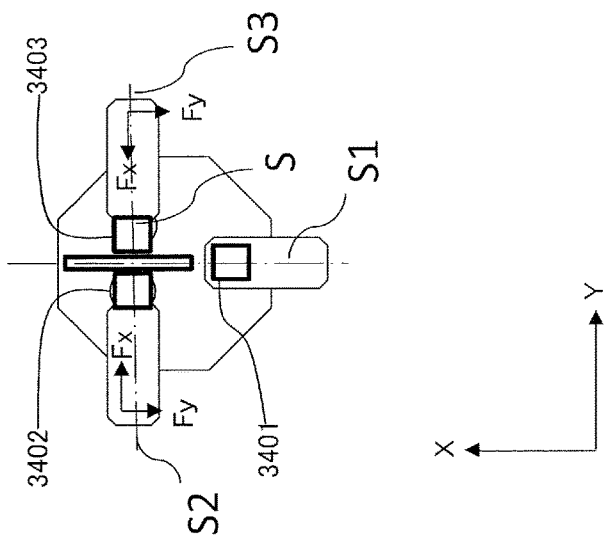
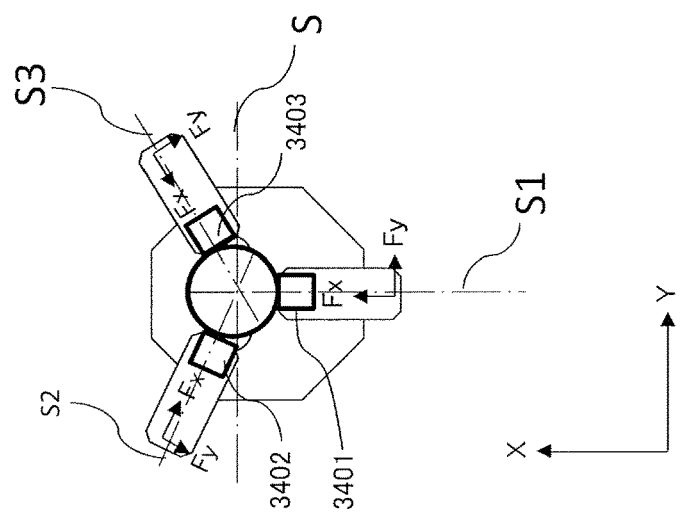
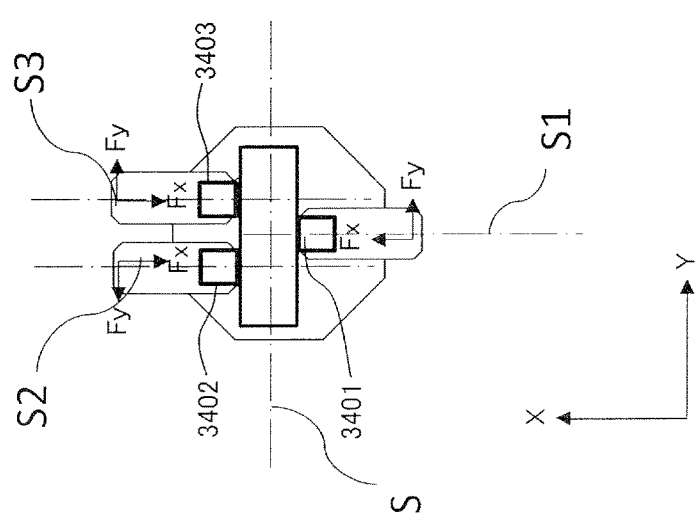

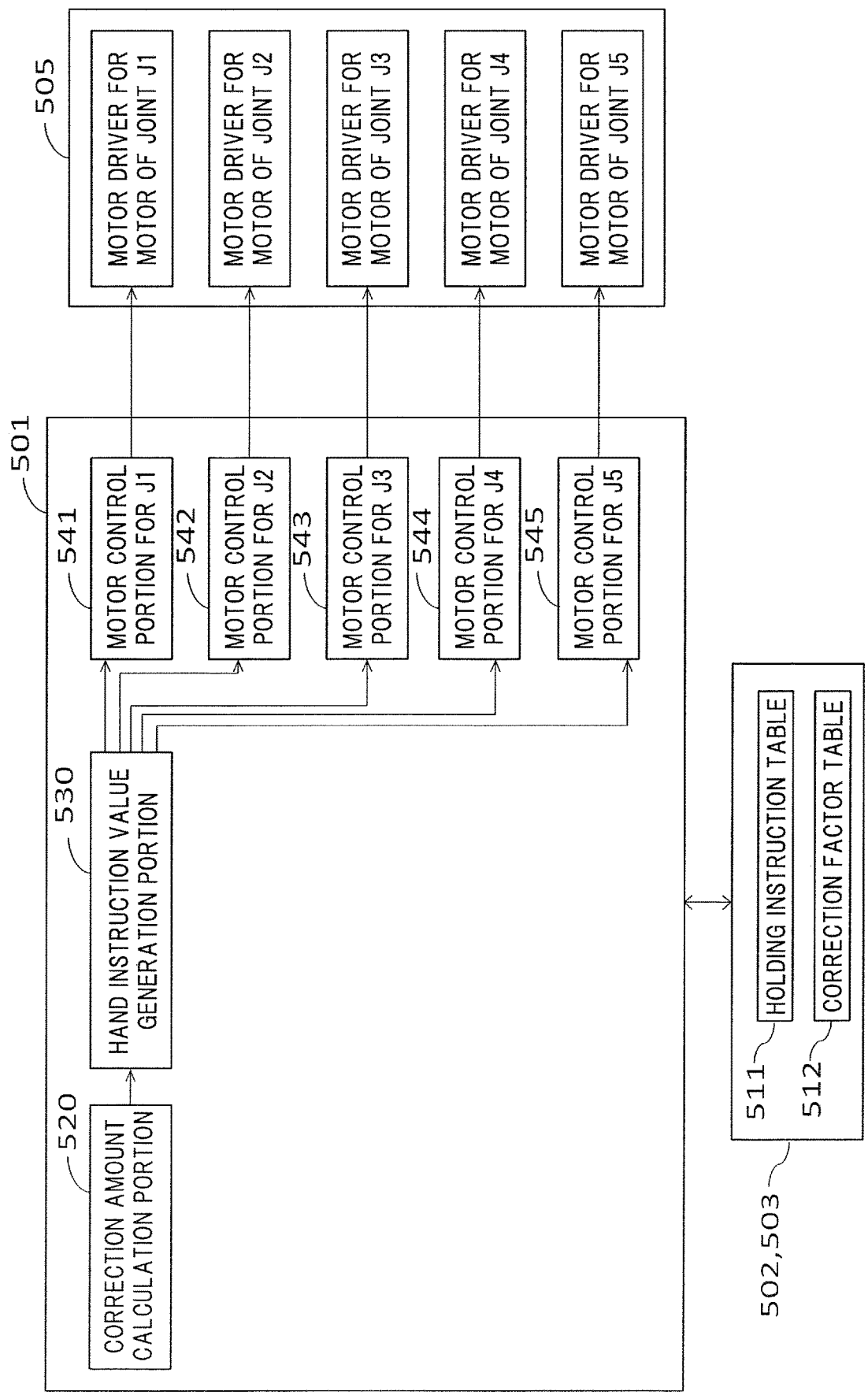

FIG.7

| OVERALL HAND SETTINGS | | | | | | | | SETTINGS FOR J1 | | SETTINGS FOR J2 | | SETTINGS FOR J3 | | SETTINGS FOR J4 | SETTINGS FOR J5 |
|---|---|---|---|---|---|---|---|---|---|---|---|---|---|---|---|
| HOLDING INSTRUCTION NUMBER | JOINT CONTROL MODE | | | | | HOLDING MODE | | POSITION INSTRUCTION VALUE | FORCE INSTRUCTION VALUE | POSITION INSTRUCTION VALUE | FORCE INSTRUCTION VALUE | POSITION INSTRUCTION VALUE | FORCE INSTRUCTION VALUE | POSITION INSTRUCTION VALUE | POSITION INSTRUCTION VALUE |
| | J1 | J2 | J3 | J4 | J5 | | | Xref1 [mm] | Fref1 [N] | Xref2 [mm] | Fref2 [N] | Xref3 [mm] | Fref3 [N] | Xref4 [deg] | Xref5 [deg] |
| 1 | P | P | P | P | P | OUTER HOLDING | | 0 | - | 0 | - | 0 | - | 0 | 0 |
| 2 | P | F | P | P | P | OUTER HOLDING | | - | 10 | 40 | - | 40 | - | 30 | 30 |
| ... | | | | | | | | | | | | | | | |

| JOINT CONTROL MODE | | | | | HOLDING MODE | POSITION INSTRUCTION VALUE FOR J4 AND J5 | CORRECTION FACTOR | | | | | |
|---|---|---|---|---|---|---|---|---|---|---|---|---|
| J1 | J2 | J3 | J4 | J5 | | | a2 | b2 | a3 | b3 | | |
| F | P | P | P | P | OUTER HOLDING | SMALLER THAN 60 DEG | a21 | b21 | a31 | b31 | | |
| | | | | | | EQUAL TO OR LARGER THAN 60 DEG | a22 | b22 | a32 | b32 | | |
| F | P | P | P | P | INNER HOLDING | SMALLER THAN 60 DEG | a23 | b23 | a33 | b33 | | |
| | | | | | | EQUAL TO OR LARGER THAN 60 DEG | a24 | b24 | a34 | b34 | | |
| P | F | P | P | P | OUTER HOLDING | - | - | - | a35 | b35 | | |
| P | F | P | P | P | INNER HOLDING | - | - | - | a36 | b36 | | |

7001 — JOINT CONTROL MODE
7002 — HOLDING MODE
7003 — POSITION INSTRUCTION VALUE FOR J4 AND J5
7004 — CORRECTION FACTOR

FIG.14

| KIND OF WORKPIECE | | | | | | Wd | | | | | }5001 |
|---|---|---|---|---|---|---|---|---|---|---|---|
| JOINT CONTROL MODE | J1 | J2 | J3 | J4 | J5 | P | F | P | P | P | }5002 |
| HOLDING MODE | | | | | | OUTER HOLDING | | | | | }5003 |
| ILLUSTRATION OF WAY OF CONTROL □:FINGER SUBJECTED TO POSITION CONTROL ▨:FINGER SUBJECTED TO FORCE CONTROL | | | | | | 3402  3403  3401  W1d | | | | | }5004 |
| RIGIDITY FACTOR OF WORKPIECE(N/mm) | | | | | | 10 | | | | | }5005 |

| OVERALL HAND SETTINGS | | | | | SETTINGS FOR J1 | | SETTINGS FOR J2 | | SETTINGS FOR J3 | | SETTINGS FOR J4 | SETTINGS FOR J5 | WORKPIECE INFORMATION |
|---|---|---|---|---|---|---|---|---|---|---|---|---|---|
| HOLDING INSTRUCTION NUMBER | JOINT CONTROL MODE J1 J2 J3 J4 J5 | HOLDING MODE | | | POSITION INSTRUCTION VALUE Xref1 [mm] | FORCE INSTRUCTION VALUE Fref1 [N] | POSITION INSTRUCTION VALUE Xref2 [mm] | FORCE INSTRUCTION VALUE Fref2 [N] | POSITION INSTRUCTION VALUE Xref3 [mm] | FORCE INSTRUCTION VALUE Fref3 [N] | POSITION INSTRUCTION VALUE Xref4 [deg] | POSITION INSTRUCTION VALUE Xref5 [deg] | RIGIDITY FACTOR OF WORKPIECE [N/mm] |
| 1 | P P P P P | OUTER HOLDING | | | 0 | - | 0 | - | 0 | - | 0 | 0 | - |
| 2 | P F P P P | OUTER HOLDING | | | 0 | - | - | 10 | 50 | - | 0 | 0 | 10 |
| ... | | | | | | | | | | | | | |

6001    6002

METHOD OF CONTROLLING HOLDING APPARATUS, HOLDING APPARATUS, AND ROBOT APPARATUS

BACKGROUND OF THE INVENTION

Field of the Invention

The present invention relates to a method of controlling a holding apparatus configured to hold a target object by plural fingers of the holding apparatus, the holding apparatus, and a robot apparatus.

Description of the Related Art

In recent years, there has been an increasing demand that an assembly step of industrial products such as cameras and printers that has been conventionally performed manually is automated by industrial robots. Most of parts constituting these products are small, have a wide variety of shapes, and are formed from a wide variety of materials. In a production line of products or parts of these kinds, a system in which a robot arm configured as an articulated arm and a holding apparatus such as a robot hand are combined is used. Particularly, nowadays, due to a demand for changeover derived from multifunctionality of robots and from manufacture of small amounts of products of many kinds, there has been an increasing demand that the robot arm and the robot hand have versatility to treat workpieces of different shapes and sizes. In addition, when assembling workpieces, a hand serving as a holding apparatus needs to stably position a workpiece serving as a holding target object at a desired position.

In some cases, a vision system such as a camera is used for positioning a specific portion of the workpiece at a standard position of the robot hand, for example, a center axis of the robot hand. In addition, Japanese Patent Laid-Open No. 2010-69584 discloses a robot capable of switching operation control of fingers between position control and force control in accordance with an operation state of an arm.

In addition, Japanese Patent Laid-Open No. 2013-255981 discloses a robot that calculates the amount of warp of a robot arm around a shaft and corrects movement around the shaft.

SUMMARY OF THE INVENTION

According to one aspect of this disclosure, there is provided a method of controlling a holding apparatus configured to hold plural kinds of target objects by plural fingers in plural relative postures, the method including calculating, on a basis of information about holding force of the fingers in a relative posture for a target object, an amount of positional deviation of the target object held by the fingers, and correcting, on a basis of the amount of positional deviation calculated in the calculating, a position of the target object held by the fingers.

Further features of the present invention will become apparent from the following description of exemplary embodiments with reference to the attached drawings. The accompanying drawings, which are incorporated in and constitute a part of the specification, illustrate exemplary embodiments, features, and aspects of the invention and, together with the description, serve to explain the principles of the invention.

BRIEF DESCRIPTION OF THE DRAWINGS

FIG. 3A illustrates a state in which a workpiece having a rectangular shape is held by a holding apparatus according to a first exemplary embodiment of the present invention.

FIG. 3B illustrates a state in which a workpiece having a circular section is held by the holding apparatus according to the first exemplary embodiment of the present invention.

FIG. 3C illustrates a state in which a workpiece having a thin shape is held by the holding apparatus according to the first exemplary embodiment of the present invention.

FIG. 4 is a block diagram schematically illustrating a motor control system according to the first exemplary embodiment of the present invention.

FIG. 7 is an explanatory diagram illustrating an example of a holding instruction table according to the first exemplary embodiment of the present invention.

FIG. 8 is an explanatory diagram illustrating an example of a correction factor table according to the first exemplary embodiment of the present invention.

FIG. 14 is an explanatory diagram illustrating an example of a held workpiece and a method of holding the held workpiece according to a second exemplary embodiment of the present invention.

FIG. 15 is an explanatory diagram illustrating an example of a holding instruction table according to the second exemplary embodiment of the present invention.

DESCRIPTION OF THE EMBODIMENTS

Exemplary embodiments of a holding apparatus and a method for controlling the holding apparatus according to the present invention will be described below with reference to drawings. To be noted, the exemplary embodiments that will be described below are merely examples, and, for example, the configuration of the details can be modified as appropriate by one skilled in the art within the gist of the present invention. In addition, numerical values described in the exemplary embodiments are just referential values and do not limit the present invention.

First Exemplary Embodiment

A holding apparatus according to the present exemplary embodiment can perform a holding operation in plural different relative postures in accordance with a holding target object such as a workpiece when holding the holding target object by plural fingers. The holding apparatus also corrects, in each of the relative postures, a positional deviation of the holding target object caused by, for example, a warp of a finger occurring when holding the holding target object.

Figure 1:
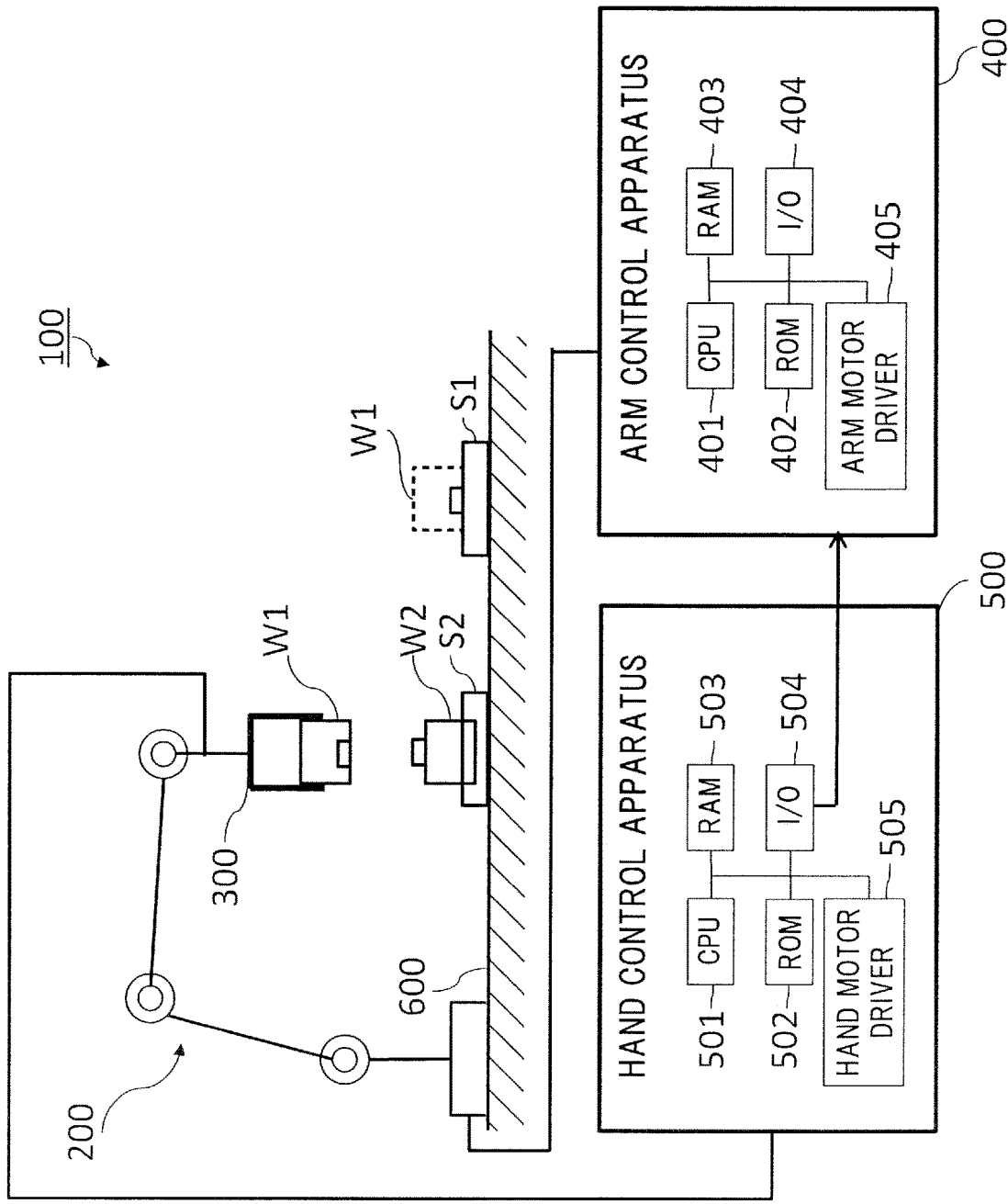
FIG. 1 is an explanatory diagram illustrating a schematic configuration of a robot system of exemplary embodiments of the present invention.

The relative postures indicate positional relationships that can be taken by the fingers of the hand in accordance with the holding target object by relatively displacing the fingers.
Robot System FIG. 1 illustrates a schematic configuration of a robot system including a holding apparatus of the present exemplary embodiment. In FIG. 1, a robot system 100 includes an arm body 200, a hand 300, an arm control apparatus 400, and a hand control apparatus 500. A workpiece W1 is a part to be assembled, and is placed on a workpiece placing stage S1. A workpiece W2 is a part on which the workpiece W1 is to be mounted, and is fixed onto a workpiece fixing stage S2.

An industrial product or a part thereof can be produced by operating and assembling the workpieces W1 and W2 by the robot system 100. For example, an assembly operation for the workpieces W1 and W2 is performed by holding and moving the workpiece W1 serving as a holding target object by using the arm body 200 and the hand 300 and fitting the workpiece W1 to a mounting portion of the workpiece W2.

The arm body 200 is an articulated robot arm in the present exemplary embodiment. A proximal end of the arm body 200 is fixed to a base 600, and a distal end of the arm body 200 is equipped with the hand 300, which is a holding apparatus, as an end effecter. An operation is performed on the workpiece W1 via the hand 300. In addition, each joint of the arm body 200 is provided with a motor and an encoder that are not illustrated. The motor serves as a drive source that drives the joint, and the encoder serves as a detector that detects a rotation angle of the motor.

The arm control apparatus 400 calculates angles in which the joints of the arm body 200 should be for an aimed position and an aimed posture of the hand 300 used for the assembly, which is the distal end of the arm, and outputs instruction values to a servo circuit that controls the motor of each joint. The motor and the servo circuit are not illustrated. The arm control apparatus 400 is connected to the hand control apparatus 500, and receives a holding instruction to the hand 300 from the hand control apparatus 500. This holding instruction can be output as, for example, as a number, that is, numerically expressed data.

The arm control apparatus 400 includes a central processing unit: CPU 401, a read-only memory: ROM 402, a random access memory: RAM 403, a general-purpose signal interface 404, and an arm motor driver 405, similarly to the hand control apparatus 500 as will be described later. Corresponding components of the hand control apparatus 500 will be denoted with reference signs 501 to 505. The general-purpose signal interface 404 communicates with sensors of the arm body 200, and the arm motor driver 405 controls the drive of the motor that drives each joint of the arm body 200.

The hand control apparatus 500 includes, as illustrated in FIG. 1, a CPU 501, and a ROM 502, a RAM 503, a general-purpose signal interface 504, a hand motor driver 505, and so forth that are connected to the CPU 501 via a bus. The CPU 501 is constituted by, for example, a microprocessor. The ROM 502 stores a program for controlling the hand 300. The program is used for performing warp correction as will be described later.

In the present exemplary embodiment, the arm control apparatus 400 and the hand control apparatus 500 are shown as separate control apparatuses. However, these control apparatuses may be configured as a single apparatus depending on an embodiment of a robot apparatus. That is, a configuration in which one common control apparatus that controls the arm body 200 and the hand 300 is provided and the common control apparatus performs the control performed by the arm control apparatus 400 and the hand control apparatus 500 in the present exemplary embodiment may be also employed.

Figure 2:
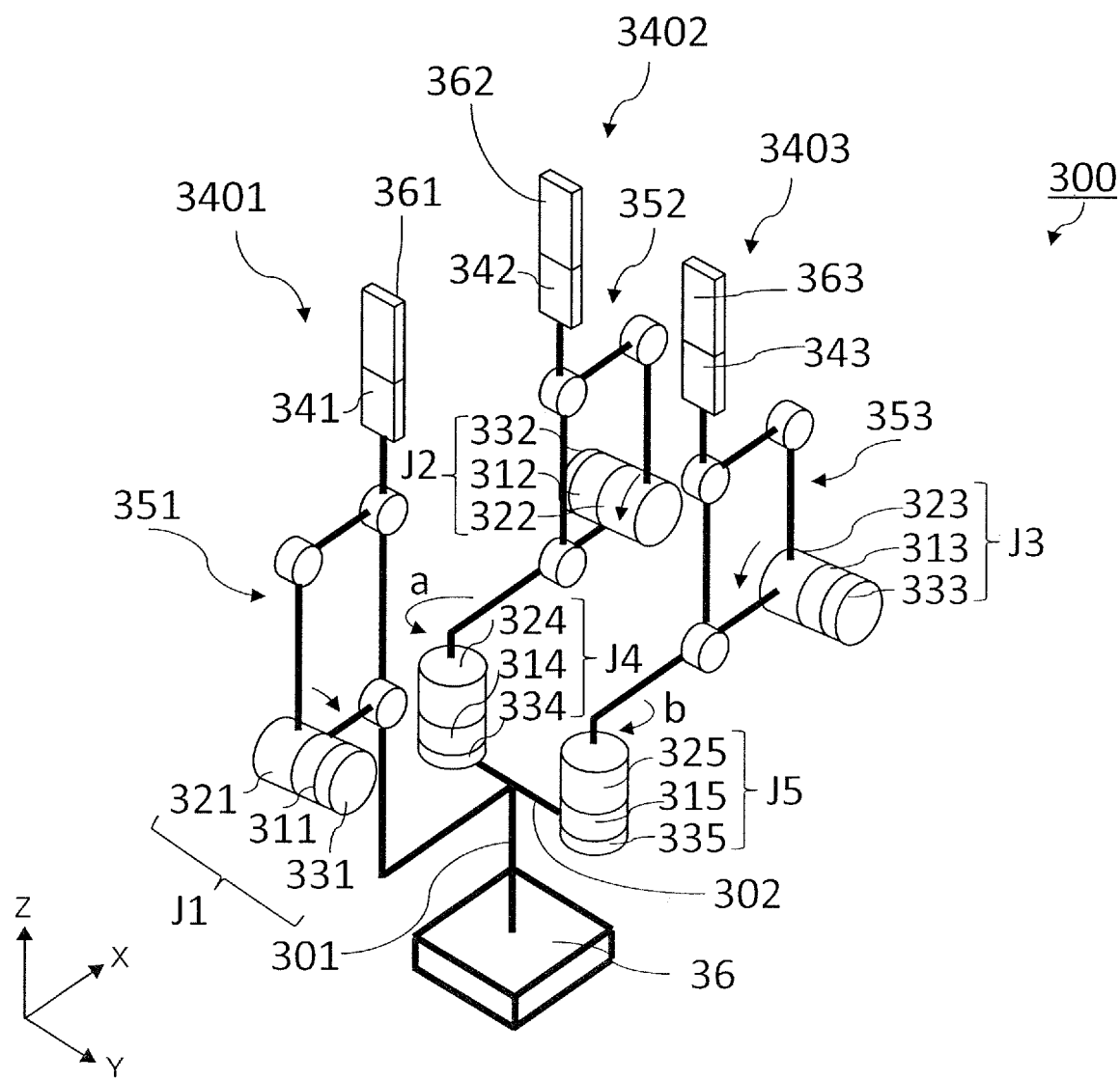
FIG. 2 is an explanatory diagram illustrating a schematic configuration of a hand of the exemplary embodiments of the present invention.

FIG. 2 illustrates a schematic configuration of the hand 300 in the present exemplary embodiment. The hand 300 includes three fingers 3401 to 3403. The three fingers 3401 to 3403 respectively include contact portions 361 to 363 that come into contact with a workpiece.

The fingers 3401 to 3403 described above are supported on a base portion 36 of the hand 300 attached to the distal end of the arm body 200. An XYZ coordinate system illustrated in FIG. 2 is a hand coordinate system having a point through which a center axis 301 of the base portion 36 passes as the origin. The origin is, for example, a point on a top face of the base portion 36.

The fingers 3401 to 3403 and the contact portions 361 to 363 are controlled so as to be relatively displaced with respect to each other by links 351, 352, and 353 and five joints J1 to J5 that are driven to rotate. With this configuration, the fingers 3401 to 3403 are operated to touch and hold, or release and move away from a target object of holding such as workpieces that will be described later.

In addition, the joints J1 to J5 of the hand 300 are provided with motors 311 to 315 as drive units to drive respective joints. Links of the fingers 3401 to 3403 are driven through reduction gears 321 to 323 respectively directly coupled with the motors 311 to 313. In addition, the motors 311 to 315 are respectively provided with encoders 331 to 335 that detect rotation angles of respective motors.

The links 351 to 353 that constitute part of a drive transmission system for the fingers 3401 to 3403 of the hand 300 are, for example, a so-called parallel quadric link mechanism as illustrated in FIG. 2. Further, the links 351 to 353 are independently driven by the motors 311 to 313 respectively provided for the joints J1 to J3. With this configuration, the contact portions 361 to 363 of the fingers 3401 to 3403 that come into contact with a workpiece can be moved independently and the workpiece can be held.

Although a parallel quadric link mechanism has been described above as an example of a contact portion moving mechanism, a mechanism such as a rack and pinion may be alternatively used as long as straight-line movement can be realized.

It is preferable to move the contact portions 361 to 363 via a parallel quadric link mechanism because the contact portions 361 to 363 can be thereby moved while keeping a posture parallel to a Z direction. That is, by forming a flat surface on at least part of the contact portions 361 to 363 and setting the flat surface to be parallel to the Z direction of the hand coordinate system, the contact portions 361 to 363 can be moved such that the flat surface thereof is always parallel to the Z direction while moving the contact portions 361 to 363. With this configuration, the contact portions 361 to 363 can come into contact with a workpiece at some position in the flat surface of the contact portions 361 to 363 even in the case where a contact position of the contact portions 361 to 363 with the workpiece is slightly displaced in the Z direction, and thus control can be performed more easily.

In addition, in the present exemplary embodiment, two fingers 3402 and 3403 out of the three fingers 3401 to 3403 are configured to be respectively pivotable about the joints J4 and J5 that each have a single degree of freedom. With this configuration, movement directions of the contact portions 361 to 363 of the fingers 3401 to 3403 can be changed. In addition, a relative posture of the fingers 3401 to 3403 can be changed when holding workpieces in accordance with various shapes of the workpieces as illustrated in, for example, FIGS. 3A to 3C that will be described later.

In this description, the finger 3401, which does not include a pivoting mechanism, of the plural fingers 3401 to 3403 may be sometimes referred to as a fixed finger. In addition, the fingers 3402 and 3403 that include pivoting mechanisms may be sometimes referred to as pivotable fingers.

In FIG. 2, a support portion 302 that is illustrated in a simplified manner as a straight line connecting the joints J4 and J5 of the fingers 3402 and 3403 is supported, for example, on the center axis 301 of the base portion 36 so as to be parallel to the Y axis of the XYZ hand coordinate system. In addition, the joints J4 and J5 are supported at the same height.

The joints J4 and J5 operate independently from each other, and are driven to rotate in directions opposite to each other by the same driving amount. With this configuration, the pivotable fingers 3402 and 3403 are controlled to take pivoting postures symmetrical with respect to the fixed finger 3401.

FIG. 2 illustrates a relative posture in which the joints J4 and J5 are respectively at 90° with respect to the Y axis of the hand coordinate system. Angles of a state in which the joints J4 and J5 are respectively rotated in directions of arrows a and b by 90° from the state illustrated in FIG. 2 will be expressed as 0°. In addition, angles of a state in which the joints J4 and J5 are respectively rotated in directions of arrows a and b by 60° from the state illustrated in FIG. 2 will be expressed as 30°. In the present exemplary embodiment, numerical expressions as described above will be sometimes used for rotation angles of the joints J4 and J5, for example, in FIGS. 3A to 3C that will be described later.

In the present exemplary embodiment, force sensors 341 to 343 are provided at distal ends of the respective fingers 3401 to 3403, and thus holding force applied to these fingers, that is, reaction force from a holding target object can be detected. With this configuration, holding force varying between plural relative postures can be detected, and thus control corresponding to a holding situation can be performed. As the force sensors, load cells, strain gauges, and force detection devices that optically measures the amount of deformation of detecting portions may be used.

FIGS. 3A to 3C illustrate examples of relative postures that can be taken by the fingers 3401 to 3403 when holding various workpieces. A coordinated system shown in the lower left corner of FIG. 3A is the hand coordinate system of XYZ, and coordinated systems shown in correspondence with the fingers 3401 to 3403 are finger coordinated systems of xyz. Various workpieces can be held by moving the three fingers 3401 to 3403 independently along straight lines and changing the pivoting postures.

In FIG. 3A, straight-line movement directions of the pivotable fingers 3402 and 3403, that is, directions of movement of the contact portions 362 and 363 moved by a contact portion moving mechanism, are parallel to a straight-line movement direction of the fixed finger 3401, that is, a direction of movement of the contact portion 361 moved by the contact portion moving mechanism. That is, the fingers 3402 and 3403 are controlled to be in such a pivoting posture that x-axis directions, that is, directions of holding force Fx, of respective finger coordinate systems of the fingers 3402 and 3403 are parallel to an x-axis direction of the finger 3401.

In other words, the fingers 3401 to 3403 are in contact with a workpiece in a state in which an angle between a surface of the fixed finger 3401 including the contact portion 361 and each of surfaces of the pivotable fingers 3402 and 3403 including the contact portions 362 and 363 is 0°. In such a relative posture as illustrated in FIG. 3A, the workpiece is held with the contact portions 361 to 363 of the three fingers 3401 to 3403 in contact with the workpiece, and this is suitable for holding, for example, a workpiece having a rectangular shape as illustrated in FIG. 3A.

In addition, in FIG. 3B, the pivotable fingers 3402 and 3403 are controlled to take a pivoting posture in which the angle of the straight-line movement direction of each of the pivotable fingers 3402 and 3403 is 120° or approximately 120° with respect to the fixed finger 3401. In other words, the angle between the surface of the fixed finger 3401 including the contact portion 361 and each of the surfaces of the pivotable fingers 3402 and 3403 including the contact portions 362 and 363 is 120°. In this pivoting posture of the pivotable fingers 3402 and 3403, x-axis directions, that is, directions of holding force Fx, of the respective finger coordinate systems concentrate on and cross at a single point at the center of the fingers 3401 to 3403. In such a relative position as illustrated in FIG. 3B, the workpiece is held with the contact portions 361 to 363 of the three fingers 3401 to 3403 in contact with the workpiece, and this relative posture is suitable for holding a workpiece having a circular section, that is, a spherical or cylindrical shape, as illustrated in FIG. 3B.

In FIG. 3C, the pivoting posture of the pivotable fingers 3402 and 3403 is perpendicular to the posture of FIG. 3A. In other words, the angle between the surface of the fixed finger 3401 including the contact portion 361 and each of the surfaces of the pivotable fingers 3402 and 3403 including the contact portions 362 and 363 is 90°, and the workpiece is held only by the pivotable fingers 3402 and 3403. As a result of this, the x-axes of the respective finger coordinate systems of the pivotable fingers 3402 and 3403 are substantially on a straight line, and directions of the x-axes, that is, directions of the holding force Fx, are opposite to each other. In such a relative posture as illustrated in FIG. 3C, the workpiece is held with only the contact portions 362 and 363 of the two pivotable fingers 3402 and 3403 in contact with the workpiece, and this relative posture is suitable for holding a workpiece having a thin shape that has a high risk of being broken. By independently moving the fingers closer to or away from each other, the workpiece having a thin shape can be stably held while reducing the risk of breaking the workpiece.

Further description of relative postures will be given. In FIGS. 3A to 3C, a virtual line extending in the x-axis direction, that is, the movement direction of the contact portion 361 moved by the contact portion moving mechanism, of the finger coordinate system of the fixed finger 3401 is denoted with a reference sign S1. In addition, a virtual line extending in the x-axis direction, that is, the movement direction of the contact portion 362 moved by the contact portion moving mechanism, of the finger coordinate system of the pivotable finger 3402 is denoted with a reference sign S2. Further, a virtual line extending in the x-axis direction, that is, the movement direction of the contact portion 363 moved by the contact portion moving mechanism, of the finger coordinate system of the pivotable finger 3403 is denoted with a reference sign S3. In the case where the angle formed by the virtual lines S1 and S2 and/or the angle formed by the virtual lines S1 and S3 is different when FIGS. 3A to 3C are viewed from above, that is, from a normal direction of the paper surface, the relative posture is different.

To be noted, in this description, the angle of the joint J4 holding a workpiece that will be described later is an angle formed by a virtual line S and the virtual line S2 of the pivotable finger 3402. In addition, the angle of the joint J5 holding a workpiece is an angle formed by the virtual line S and the virtual line S3 of the pivotable finger 3403. The virtual line S extends in a direction perpendicular to the virtual line S1, and the unit of the angles is deg.

FIG. 4 illustrates a schematic configuration of a control function of the hand control apparatus 500 in the form of a virtual block diagram. The CPU 501 can calculate respective rotation angles of the joints J1 to J5 by using output values of the encoders 331 to 335. In this case, the CPU 501 can convert the output values of the encoders 331 to 335 into the respective rotation angles of the joints J1 to J5 by using reduction ratios of reduction gears 321 to 325 that will be described later.

The CPU 501 includes a correction amount calculation portion 520 that will be described later. In addition, the CPU 501 also includes a hand instruction value generation portion 530 and motor control portions 541 to 545 as a drive control portion that relatively displaces the fingers 3401 to 3403 in accordance with a correction amount obtained by the correction amount calculation portion 520.

A holding instruction table 511 and a correction factor table 512 that will be described later may be disposed in, for example, a storage region of the RAM 503. Alternatively, in the case where table memories for these tables can be configured as a ROM depending on an implementing specification of the apparatus, these tables 511 and 512 may be disposed in a storage region of the ROM 502.

Further, the RAM 503 is also used as a memory for temporary storage that is used when performing an arithmetic operation by the CPU 501 or as a register region that is set as necessary. The hand motor driver 505 drives five-axis motors 311 to 315 that control movement and pivoting of fingers of the hand 300 on the basis of control values of respective motor control portions 541 to 545.

The hand instruction value generation portion 530 transmits a joint control mode, that is, position control or force control, of the motors 311 to 315 serving as drive sources of the joints J1 to J5 and instruction values for the motors 311 to 315 to the respective motor control portions 541 to 545. The instruction values for the motors 311 to 315 are position instruction values in the case where the joint control modes for the motors 311 to 315 are position control, and are force instruction values in the case where the joint control modes for the motors 311 to 315 are force control.

In addition, the hand instruction value generation portion 530 corrects the instruction values on the basis of the correction amount calculated by the correction amount calculation portion 520, and then transmits the corrected instruction values to the motor control portions 541 to 545. The functions of the motor control portions 541 to 545 are the same, and FIG. 5 illustrates the configuration of each of the motor control portions 541 to 545 herein.

Figure 5:
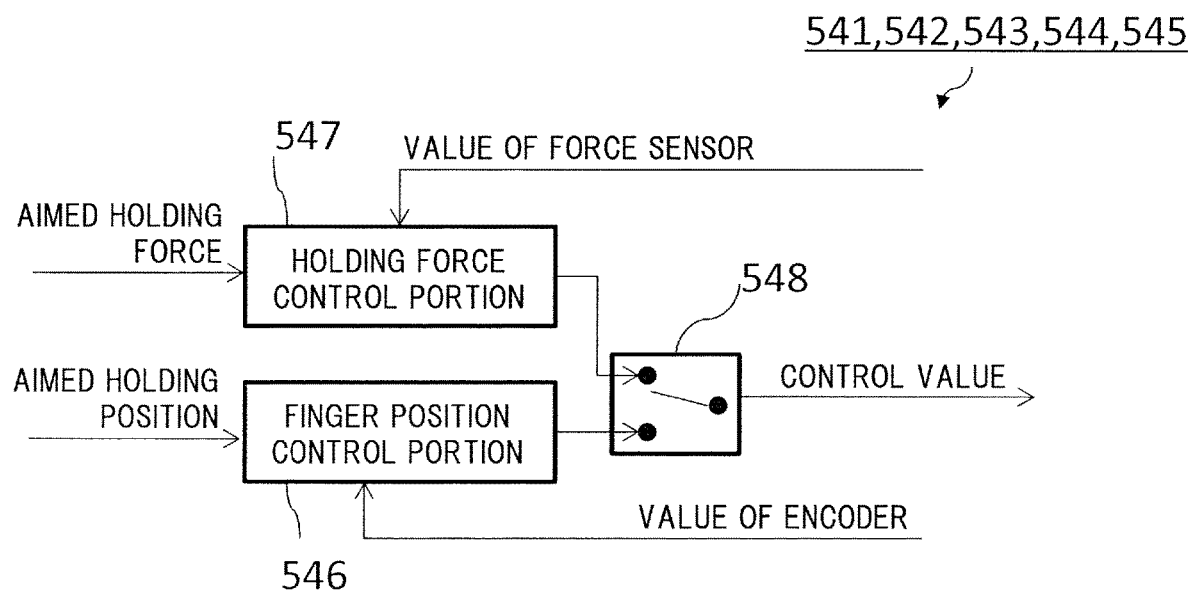
FIG. 5 is a block diagram illustrating details of the motor control system according to the first exemplary embodiment of the present invention.

In FIG. 5, in the case where the joint control mode of the motors 311 to 315 is position control, feedback control is performed by a finger position control portion 546 on the basis of the position instruction values and values from the encoders 331 to 335, and a control value of finger position is output. In the case where the joint control mode of the motors 311 to 315 is force control, feedback control is performed by a holding force control portion 547 on the basis of an aimed holding force and values detected by the force sensors 341 to 343, and a control value of holding force is output.

That is, the holding force varies depending on which of the position control and the force control is selected even in the case where the same workpiece is held in the same relative posture in which the same angle is formed by the virtual lines S1 and S2 and the same angle is formed by the virtual lines S1 and S3.

Values related to holding force control such as the position instruction values, values from the encoders 331 to 335, aimed holding force, and values detected by the force sensors 341 to 343 described above are referred to as information related to holding force. A joint control mode switching portion 548 is constituted by an analog switch or a multiplexer, selects the finger position control portion 546 or the holding force control portion 547 on the basis of the control mode of the motors 311 to 315, and outputs a control value.

Figure 6:
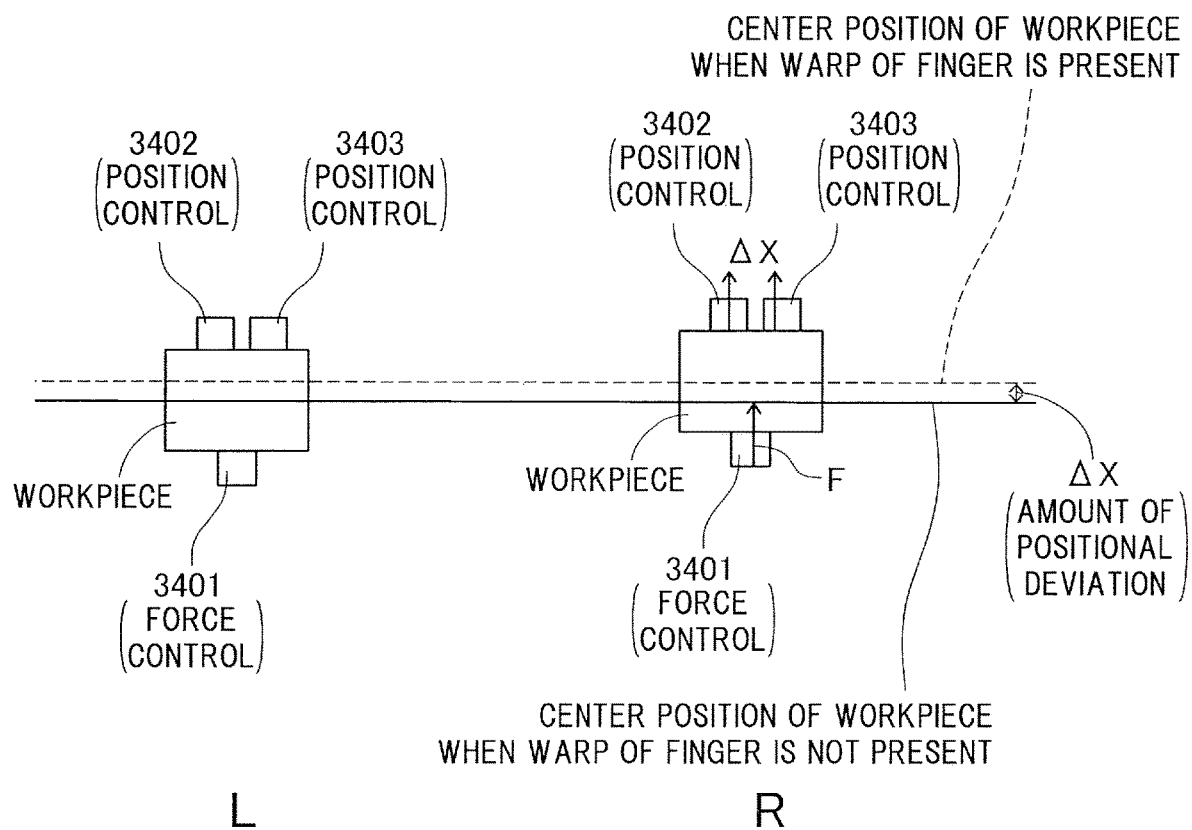
FIG. 6 illustrates a held state of a workpiece.

FIG. 6 is an explanatory diagram for description of an amount of positional deviation of a workpiece occurring when holding the workpiece by using the control function described above. FIG. 6 illustrates an example of a relative posture corresponding to FIG. 3A. In FIG. 6, a force control mode is selected for the joint control mode of the finger 3401, and a position control mode is selected for the joint control modes of the fingers 3402 and 3403.

A left side diagram L of FIG. 6 illustrates a state in which each finger is in contact with the workpiece. The workpiece is positioned by the fingers 3402 and 3403 that are subjected to position control, and the workpiece is held by an arbitrary holding force by pressing the finger 3401 against the fingers 3402 and 3403.

However, in the case where each finger is easily elastically deformed, the fingers 3402 and 3403 are warped by an amount indicated by arrows ΔX due to an arbitrary holding force F when the finger 3401 is pressed against the fingers 3402 and 3403 to hold the workpiece by the holding force F as illustrated in a right side diagram R of FIG. 6.

Therefore, in the right side diagram R in which the fingers 3402 and 3403 are warped, the center position of the workpiece is displaced, by an amount of ΔX, from the position in the left side diagram L in which the fingers 3402 and 3403 are not warped. Further, since ΔX represents deviation derived from a warp of the fingers 3402 and 3403, ΔX cannot be detected by encoders, and cannot be corrected via feedback control.

Further, in the case where the relative posture changes as illustrated in FIGS. 3B and 3C, the direction in which holding force is applied by a finger subjected to force control changes, and the amount of deviation becomes different even when the holding force is the same. Therefore, position correction of the workpiece corresponding to each relative posture is necessary.

According to the present exemplary embodiment, the positional deviation of the workpiece serving as a holding target object caused by a warp of fingers is calculated for each of plural relative postures, and the position of the workpiece is corrected on the basis of the amount of positional deviation of the calculation result.

A holding instruction table 511 or 611 and a correction factor table 512 that will be described later and that are constituted by data in which control values, correction factors, rigidity factors of holding target objects, and the like set for respective fingers are associated with each other are stored in a storage device such as the ROM 502 or the RAM 503 in advance. The amount of positional deviation of the workpiece caused by a warp of fingers is estimated in accordance with these tables, and a correction amount for correcting the positional deviation is calculated. Then, the position of the workpiece is controlled in accordance with the correction amount. With this configuration, the positional deviation of the workpiece caused by a warp of fingers can be corrected. A method of correcting the positional deviation of the workpiece using a holding instruction table and a correction factor table will be described below in detail.

FIG. 7 illustrates an exemplary configuration of a holding instruction table according to the present exemplary embodiment. Various control parameters can be arranged in the holding instruction table 511 of FIG. 7 in association with holding instruction numbers corresponding to selectable holding instructions in accordance with control specification of the hand 300.

The holding instruction table 511 of FIG. 7 is mainly constituted by a field 6001 of overall hand settings and a field 6002 of control parameters of the joints J1 to J5. In the holding instruction table 511, records including joint control modes, holding modes, and control parameters set for respective joints are arranged in correspondence with respective holding instruction numbers. The control parameters include position instruction values and force instruction values. In the field 6001 of the overall hand settings, the joint control modes and the holding modes are stored in correspondence with respective holding instruction numbers. In the field 6002 of the control parameters, a position instruction value or a force instruction value is stored for each of the joints J1 to J5 of the hand 300.

To be noted, parts described with suffices in, for example, formulae that will be described later may be sometimes described without suffix in the description below or in drawings.

In FIG. 7, in the field of joint control mode, data in which whether the joints J1 to J5 of the hand 300 are controlled via position control or force control is described is stored. In the data, position control is indicated by P and force control is indicated by F. In the present exemplary embodiment, each joint is assigned with P or F in accordance with the joint control mode, and P and F are arranged in correspondence with respective motor numbers.

In the field of holding mode, data representing either one of outer holding or inner holding is set. Outer holding is a holding mode in which an outer side of a workpiece is held by plural fingers of the hand 300, and inner holding is a holding mode in which the workpiece is supported on an inner side thereof by inserting fingers in a concave portion of the workpiece. For the sake of convenience of description, an example of outer holding will be described below.

In the field 6002 of the control parameters for the joints J1 to J5, a position instruction value for a motor is set for a joint for which P is set as the joint control mode, and a force instruction value is set for a joint for which F is set as the joint control mode.

As the position instruction value for each motor, a value corresponding to a holding stroke is set in the case where the joint is the joint J1, J2, or J3. In this case, the unit of the value is mm. In the case where the joint is the joint J4 or J5, a value corresponding to a holding angle is set. In this case, the unit of the value is deg. In addition, as the force instruction value for each joint, a value corresponding to the holding force to be generated at the distal end of each finger is set, and the unit of the value is N. In the present exemplary embodiment, position instruction values and force instruction values can be set for the joints J1, J2, and J3.

In FIG. 7, instruction values Xref and Fref, which are respectively a position instruction value and a force instruction value before correction, are respectively stored for a finger subjected to position control and a finger subjected to force control. A holding instruction number 1 of PPPPP corresponds to a case where position control is performed on all the joints J1 to J5 in accordance with the size and detailed shape of the workpiece In addition, a holding instruction number 2 of FPPPP, in which only the joint J1 is subjected to force control, corresponds to holding control in which the angles of the joints J4 and J5 are set to 30°. In the holding control of the holding instruction number 2 of FPPPP, in which only the joint J1 is subjected to force control, a force instruction value Fref1 for the joint J1 is 10 N, and position instruction values Xref2 and Xref3 for the joints J2 and J3 for the other two fingers 3402 and 3403 are 40 mm.

FIG. 8 illustrates an exemplary configuration of a correction factor table according to the present exemplary embodiment. In the correction factor table 512, joint control modes are stored in a field 7001, holding modes are stored in a field 7002, position instruction values for the joints J4 and J5 are stored in a field 7003, and correction factors $a_2$, $b_2$, $a_3$, and $b_3$ corresponding to respective combinations of settings are stored in a field 7004.

In the present exemplary embodiment, at least one of the fingers 3401 and 3402 is subjected to force control, and the other two or one finger is subjected to position control. In addition, the correction factor table 512 of FIG. 8 stores the correction factors $a_2$, $b_2$, $a_3$, and $b_3$ for calculating the amount of positional deviation $\Delta X$ by using formulae, for example, formulae (2) to (4) that will be described later. The first suffix to a or b in the reference sign of the correction factor corresponds to a number at the end of the reference signs of the fingers 3401 to 3403.

In addition, values $a_{21}$ to $a_{24}$, $b_{21}$ to $b_{24}$, $a_{31}$ to $a_{36}$, and $b_{31}$ to $b_{36}$ of the correction factors $a_2$, $b_2$, $a_3$, and $b_3$ set in the correction factor table 512 of FIG. 8 are obtained in advance via calibration or experiments. The second suffix to the correction factor a or b corresponds to a data number that is set to increase in accordance with the arrangement order in the table for the sake of convenience.

The values $a_{21}$ to $a_{24}$, $b_{21}$ to $b_{24}$, $a_{31}$ to $a_{36}$, $b_{31}$ to $b_{36}$ of the correction factors $a_2$, $b_2$, $a_3$, and $b_3$ may be obtained via the following calibration method. That is, correction factors are divided between respective cases of the joint control mode, holding mode, and position instruction values for the joints J4 and J5. Then, for each case, the amount of warp caused by holding a standard workpiece is measured for several holding forces within a range of holding force that is to be used for assembly, and the correction factors $a_2$, b2, a3, and b3 are obtained for each case by calculating such correction factors that the correction amount eliminates the amount of warp generated in the case by using, for example, a least square method.

Figure 9:
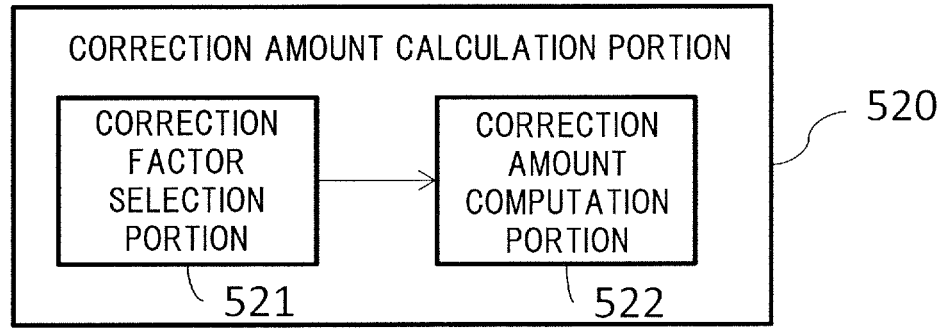
FIG. 9 is a block diagram illustrating a schematic configuration of a correction calculation portion according to the first exemplary embodiment of the present invention.

FIG. 9 illustrates a functional configuration of the correction amount calculation portion 520 according to the present exemplary embodiment. In FIG. 9, the correction amount calculation portion 520 is constituted by a correction factor selection portion 521 and a correction amount computation portion 522. The correction factor selection portion 521 extracts the joint control modes, holding mode, and position instruction values Xref or force instruction values Fref for the joints J1 to J5 corresponding to the holding instruction number on the basis of the holding instruction table 511 illustrated in FIG. 7.

Next, corresponding correction factors are selected on the basis of the extracted joint control modes, holding mode, and position instruction values or force instruction values for the joints J1 to J5, and the correction factor table 512 illustrated in FIG. 8. The correction amount computation portion 522 calculates a correction amount of warp ΔX for each finger on the basis of the correction factors of the correction factor table 512 selected by the correction factor selection portion 521 and a force instruction value of the holding instruction table 511.

Figure 10:
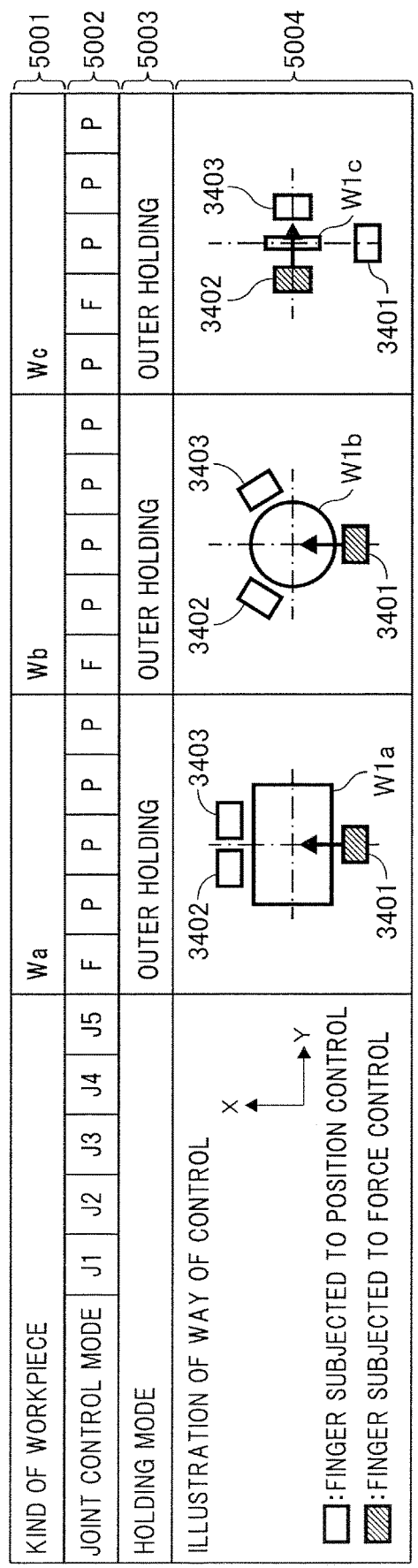
FIG. 10 is an explanatory diagram for description of a method of holding a workpiece illustrated in FIG. 4 according to the first exemplary embodiment of the present invention.

FIG. 10 illustrate how the relative postures of the fingers 3401 to 3403 illustrated in FIG. 3 are controlled. In the present exemplary embodiment, three kinds of workpieces different in shapes are prepared for being held by the hand 300. These workpieces are respectively indicated by Wa, Wb and Wc in a field 5001. In FIG. 10, the joint control mode, holding mode, and way of control are respectively shown in fields 5002, 5003, and 5004 for each kind of workpiece shown in the field 5001.

To be noted, in the simplified illustration of ways of control in the field 5004, the horizontal direction in the illustration corresponds to the Y-axis direction of FIG. 3, and the vertical direction corresponds to the X-axis direction of FIG. 3. In addition, in the illustration of ways of control in the field 5004, a finger subjected to force control is shown in a black color, and fingers subjected to position control are shown in a white color for each kind of workpiece.

The workpiece W1a is a rectangular object, and is held via outer holding by the fingers 3401 to 3403 of the hand 300 in a three-finger-opposing posture in which the angles of the joints J4 and J5 are both 90°. In this case, the finger 3401 is subjected to force control, and thus the joint control modes are set to FPPPP.

The workpiece W1b is a cylindrical or spherical workpiece that is an object having a circular section, and is held via outer holding by the fingers 3401 to 3403 of the hand 300 in a three-finger-equal-distribution posture in which the angles of the joints J4 and J5 are both 30°. In this case, the finger 3401 is subjected to force control, and thus the joint control modes are set to FPPPP.

In addition, the workpiece W1c is a rectangular object, and is held via outer holding by the fingers 3402 and 3403 of the hand 300 in a two-finger-opposing posture in which the angles of the joints J4 and J5 are both 0°. In this case, the finger 3402 is subjected to force control, and thus the joint control modes are set to PFPPP.

Figure 11:
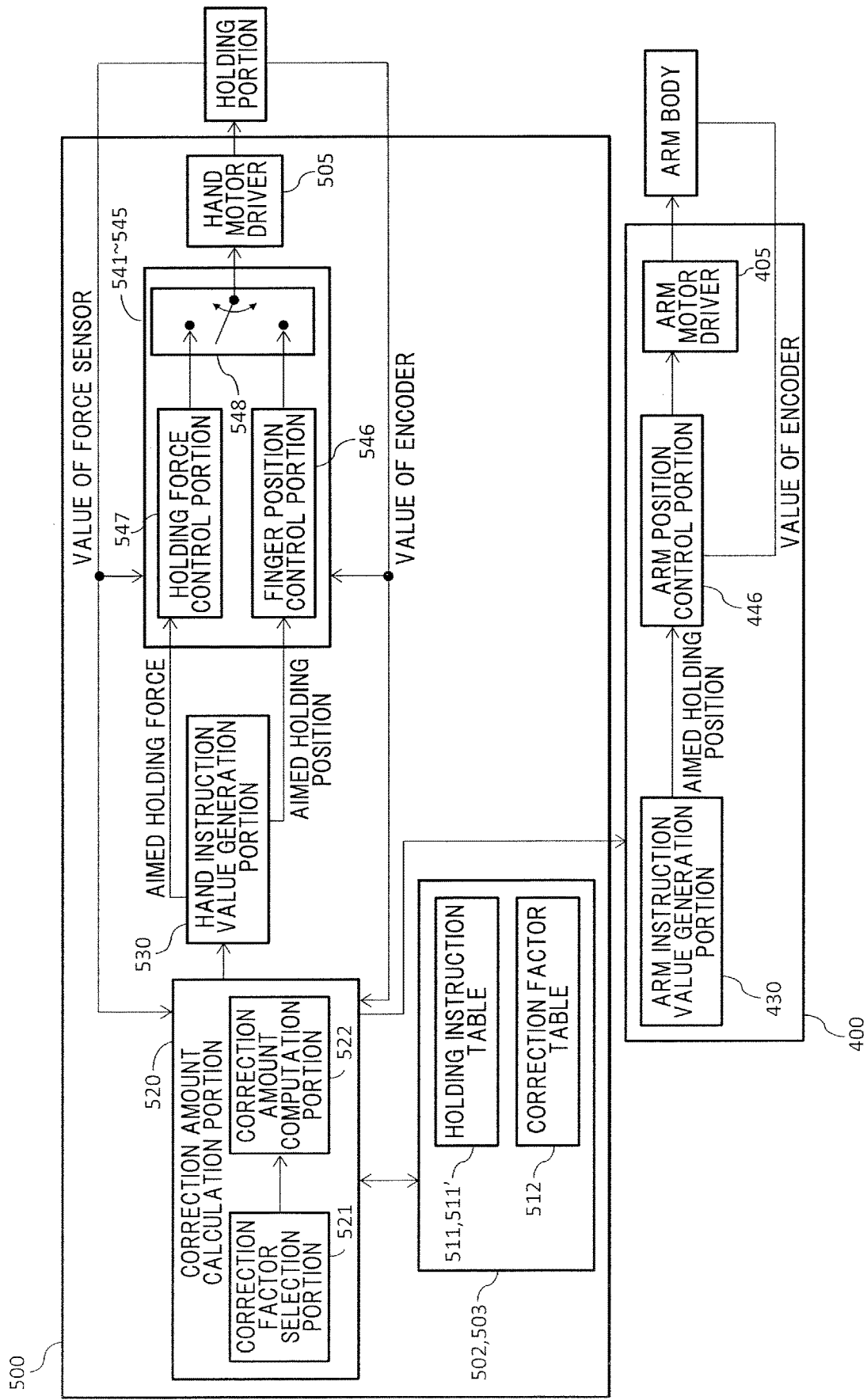
FIG. 11 is a detailed block diagram of a robot system according to the first exemplary embodiment.

A control method of correcting, by the hand control apparatus 500 or the arm control apparatus 400, the positional deviation of the workpiece caused by the warp of fingers corresponding to control of the relative posture will be described. With regard to this control, FIG. 11 illustrates a detailed block diagram of the hand control apparatus 500 and the arm control apparatus 400 according to the present exemplary embodiment.

Figure 12:
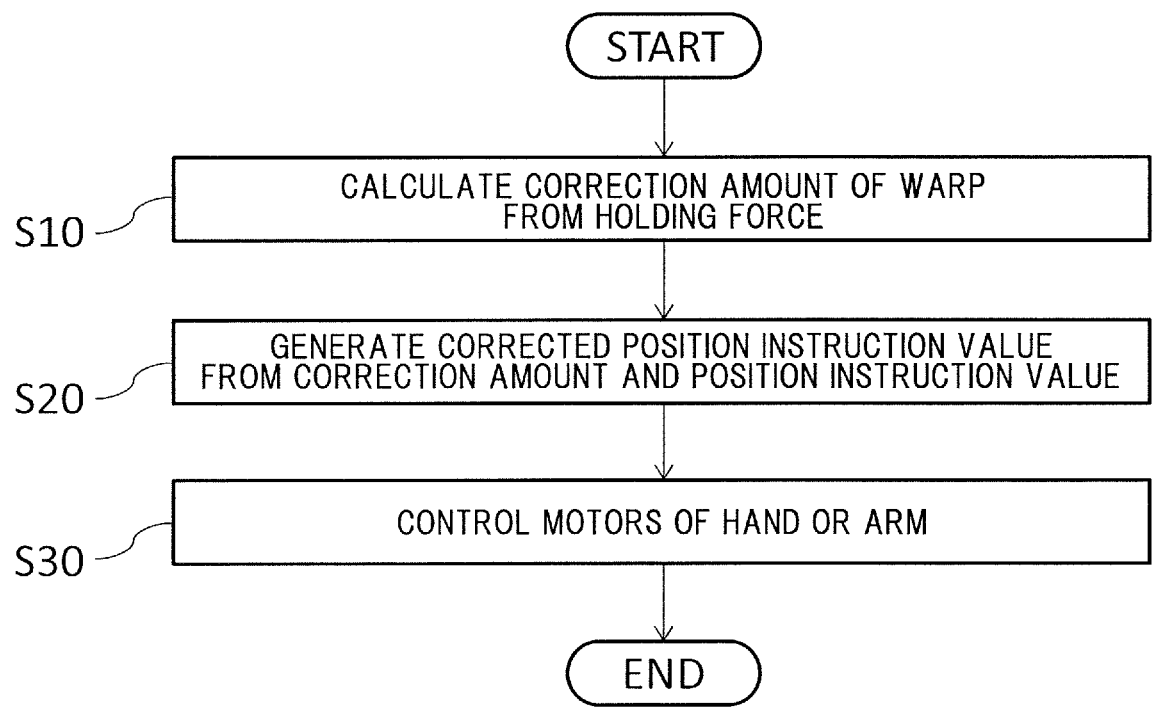
FIG. 12 is a flowchart illustrating a processing procedure for correcting a warp of a hand at a fingertip position by a hand control apparatus according to the first exemplary embodiment of the present invention.

FIG. 12 is a flowchart illustrating a flow for correcting the position of the held workpiece by the correction amount calculation portion 520. In FIGS. 11 and 12, the hand control apparatus 500 first calculates, by the correction amount calculation portion 520, a correction amount of warp from a force instruction value of the holding instruction table 511 and correction factors of the correction factor table 512 in step S10. At this time, a value detected by the force sensor of each finger may be used for the calculation. The correction amount or warp amount is calculated by such an arithmetic operation as represented by the formulae (2) to (4). In the formulae, the correction amount of an i-th finger is represented by $\Delta X_{refi}$ (i=2 or 3).

Next, in step S20, the hand instruction value generation portion 530 passes position instruction values $X'_{refi}$ obtained by correcting position instruction values $X_{refi}$ on the basis of the correction amount $\Delta X_{refi}$ (i=2 or 3) via such an arithmetic operation as represented by a formula (1) below to the respective motor control portions 541 to 545. In addition, an arm instruction value generation portion 430 may sum up calculated correction amounts, convert the summed up amount into an amount of positional deviation of the workpiece in a common coordinate system of the hand 300, and pass the amount of positional deviation to an arm position control portion 446.

$$X_{ref}' = X_{refi} + \Delta X_{refi} \quad (1)$$

In the formula (1) shown above, $X_{refi}$ represents a position instruction value before correction for an i-th finger that is subjected to position control. The position correction value $X_{refi}$ corresponds to the instruction value shown in FIG. 7.

Next, in step S30, the motor control portions 541 to 545 cause the hand 300 to operate on the basis of the instruction values $X'_{refi}$ described above. At this time, correction may be performed by causing the arm body 200 to operate.

Figure 13:
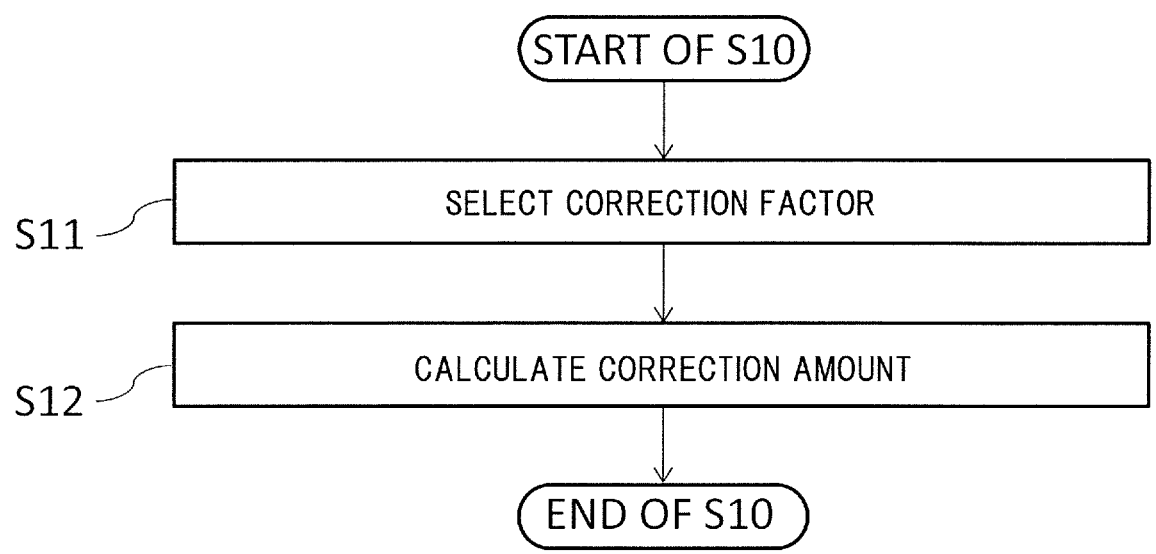
FIG. 13 is a flowchart illustrating a processing procedure for correcting a warp of a hand at a fingertip position by the hand control apparatus according to the first exemplary embodiment of the present invention.

Step S10 will be described in further detail with reference to FIG. 13. First, in step S11, the correction factor selection portion 521 selects correction factors with reference to the correction factor table 512 of FIG. 8. For example, in the case of the correction factor table 512 of FIG. 8, values a21, b21, a31, and b31 are respectively selected for the correction factors a2, b2, a3, and b3 in the case of holding the workpiece Wa.

Similarly, values a22, b22, a32, and b32 are respectively selected for the correction factors a2, b2, a3, and b3 in the case of holding the workpiece Wb, and values a35 and b35 are respectively selected for the correction factors a3 and b3 in the case of holding the workpiece Wc.

Next, in step S12, correction amounts are calculated from the correction factors and holding force by the correction amount computation portion 522. For example, in the case of holding the workpiece Wa, correction amounts $\Delta X_{ref2}$ and $\Delta X_{ref3}$ are calculated by using, for example, the following formula (2).

$$\Delta X_{ref2} = a_{21} F_{ref1} + b_{21}$$

$$\Delta X_{ref3} = a_{31} F_{ref1} + b_{31} \quad (2)$$

$F_{ref1}$ represents an instruction value of holding force generated in the finger 3401. At this time, a value detected by the force sensor 341 may be used as the value of $F_{ref1}$. In the formula, $\Delta X_{ref2}$ and $\Delta X_{ref3}$ respectively represent correction amounts for the fingers 3402 and 3403.

To be noted, Xref and ΔXref that represent a position instruction value and a correction amount thereof are amounts of displacement in a direction in which each finger is moved when holding a workpiece, that is, a direction in which fingers approach one another. The amount of displacement of the workpiece when displacing the workpiece by fingers or the arm body 200 is determined from these position instruction values.

Here, in the case of holding the workpiece Wb, correction amounts ΔXref2 and ΔXref3 are calculated by using, for example, the following formula (3).

$$\Delta X_{ref2} = a_{22} F_{ref1} + b_{22}$$

$$\Delta X_{ref3} = a_{32} F_{ref1} + b_{32} \quad (3)$$

Similarly, in the case of holding the workpiece Wc, the correction amount ΔXref3 is calculated by using a formula (4). In the formula (4), Fref2 represents an instruction value of holding force generated in the finger 3402. At this time, a value detected by the force sensor 342 may be used as the value of Fref2.

$$\Delta X_{ref3} = a_{36} F_{ref2} + b_{36} \quad (4)$$

In the holding control described above, although the workpieces Wa and Wb are both held by three fingers, the angles of the joints J4 and J5 are different between the case of holding the workpiece Wa and the case of holding the workpiece Wb. Therefore, even in the case where the workpieces Wa and Wb are held with the same holding force, the warp of the fingers 3402 and 3403 is different between the case of holding the workpiece Wa and the case of holding the workpiece Wb. Therefore, different values of the correction factors a2, b2, a3, and b3 are read from the correction factor table 512 and used as described above. With this configuration, the position of the workpiece can be appropriately corrected in accordance with the relative posture of the fingers 3401 to 3403.

In this way, according to a holding apparatus of the present exemplary embodiment, holding control including a such warp correction as described above can be performed. Therefore, the position of the workpiece can be corrected with a high precision even in the case where the pivoting posture of the joints J4 and J5 is different and the workpiece is held in plural relative postures as illustrated in FIGS. 3A to 3C, and thus the precision of positioning of the workpiece can be greatly improved.

Further, the correction amount can be passed to the arm control apparatus 400, and the positional deviation of the workpiece can be corrected by using the arm body 200. In addition, the number of the force sensors for force detection is not limited as long as a force sensor provided for at least one of the fingers that are actually used for holding, and, for example, it is not necessary to provide all the fingers with force sensors. Therefore, the hardware configuration can be simple and inexpensive. In addition, a complicated control procedure such as a procedure in which a position control amount is determined in accordance with a force control state of all the fingers is not needed, and quick and responsive hand control can be performed.

Although the description of inner holding has been omitted, since the reduction gears 321 to 325 typically have a backlash, there is a possibility that the amount of warp of the fingertips differs between the case of outer holding and the case of inner holding even when the workpiece is held by the same holding force. However, in the hand control apparatus 500 of the present exemplary embodiment, different correction factors are stored for different holding modes such as the outer holding and inner holding in the correction factor table 512.

Therefore, the position of the workpiece can be corrected with a high precision even in the case where the joints J1 to J5 of the hand 300 have a backlash, and thus the precision of positioning of the workpiece can be improved. For example, in the case where the workpiece is held with a holding force of 10 N and a rigidity factor of a driving system of each finger for the fingertip is 50 N/mm, the amount of warp of the fingertip is about 10 N/(50 N/mm) =0.2 mm. By using the warp correction of the present exemplary embodiment, the precision of positioning of the workpiece can be improved by about 0.2 mm.

As described above, according to the present exemplary embodiment, the position of the workpiece can be corrected with a high precision by calculating the positional deviation of the held workpiece derived from a warp of fingers caused by holding force and correcting the positional deviation by the hand 300 or the arm body 200, and the precision of positioning of the workpiece can be improved. According to the present exemplary embodiment, by creating the correction factor table 512 in advance as appropriate, the position of the workpiece can be corrected with a high precision in accordance with a mechanical specification of the hand. For example, the position of the workpiece can be corrected appropriately and with a high precision in accordance with the configuration of the hand even in the case of, for example, a hand with a thin and long tip to treat a small workpiece or a hand with a tip having a high elasticity for protection of the workpiece. This means that the position of the workpiece can be corrected appropriately and with a high precision in accordance with the configuration even in the case of a hand in which a wave gear whose shaft tends to be twisted when a torque is applied is used as a reduction gear. In addition, a similar effect can be also expected for a hand equipped with a force sensor that itself requires to be warped by the holding force of the fingertip to detect the holding force.

In addition in a manufacturing line of an actual product or a part, a situation in which the position instruction values Xref of the fingers of the hand in assembly is changed to shorten the cycle time of an assembly process is expected. According to the present exemplary embodiment, the workpiece can be held without degrading the precision of positioning of the workpiece even in the case where such change has occurred.

In addition, a manufacturing line in which an industrial product or a part thereof can be assembled by holding a workpiece serving as a target object by using a hand shown in the exemplary embodiment described above with a robot arm can be configured. In this case, according to the present exemplary embodiment, the precision of the position of the workpiece can be improved greatly, and an operation of assembling a product or a part quickly and with a high precision can be performed automatically.

Second Exemplary Embodiment

In the first exemplary embodiment described above, a condition such as the rigidity or the elasticity of the workpiece to be held is not taken into consideration, and it is assumed that the workpiece is not deformed by the holding force and that the workpiece has a predetermined dimension and there is no deviation from the predetermined dimension. However, the present invention can be implemented in the case where the workpiece serving as a holding target object is deformed by the holding force of the hand serving as a holding apparatus and where there is a possibility that the dimension of the workpiece is deviated from the predetermined dimension.

In a second exemplary embodiment, holding control in which the position of the workpiece serving as a holding target object is corrected by using a rigidity factor of the workpiece is described as an example. The second exemplary embodiment can be implemented in the case where there is a variation in the dimension of the workpiece in a holding direction within a range of tolerance and it is desired that the workpiece is positioned at a predetermined position, for example, a center position of a hand.

FIG. 14 illustrates an example of holding control of a workpiece according to the second exemplary embodiment in a similar manner to FIG. 10. As the second exemplary embodiment, holding control of the case of holding a workpiece W1d illustrated in FIG. 14 will be described below. Hereinafter, different parts concerning hardware and a control system will be illustrated or described, and detailed description of parts similar to the first exemplary embodiment will be omitted assuming that the similar parts can be configured and can act in a similar manner to the first exemplary embodiment.

In addition, in the description below, the same or similar reference signs are used for the same or similar components or control functions as or to the first exemplary embodiment. In particular, the hardware configuration concerning placement of the joints, force sensors, and the like of the hand 300 and the arm body 200 is similar to the hardware configuration of the first exemplary embodiment illustrated in FIGS. 1 and 2.

The workpiece W1d is held by the fingers 3402 and 3403 in the two-finger-opposing posture of the hand 300 in which the angles of the joints J4 and J5 are both 0°, and the finger 3402 is subjected to force control. Therefore, PFPPP is selected as the joint control modes of the field 5002, and the holding mode of the field 5003 is outer holding. As shown in the field 5004 of way of control, the workpiece W1d is held by two fingers. The workpiece W1d has a variation in the dimension thereof in a direction in which the workpiece W1d is held by two or three fingers. In addition, the workpiece W1d is not a rigid body and has a spring characteristic and a rigidity factor of 10 N/mm indicated in a field 5005 in the present exemplary embodiment.

In the present exemplary embodiment, the robot system 100 is used similarly to the first exemplary embodiment. The robot system 100 includes the arm body 200, the hand 300, the arm control apparatus 400, and the hand control apparatus 500.

The difference from the first exemplary embodiment is in the hand control apparatus 500 and the workpiece W1d. The hand control apparatus 500 and the workpiece W1d that are different from the first exemplary embodiment will be described below. The hand control apparatus 500 is constituted by, for example, the CPU 501, the ROM 502, the RAM 503, the general-purpose signal interface 504, and the hand motor driver 505 illustrated in FIG. 1 similarly to the first exemplary embodiment. The difference from the first exemplary embodiment is in information stored in the ROM 502 and the RAM 503. The ROM 502 stores a control program for the hand 300 that realizes warp correction according to the second exemplary embodiment that will be described later. In addition, the RAM 503 stores the holding instruction table 611 of FIG. 15 and the correction factor table 512.

In the present exemplary embodiment, the holding instruction table 611 is configured as illustrated in FIG. 15.

FIG. 15 illustrates the holding instruction table 611 in a similar manner to the holding instruction table 511 of the first exemplary embodiment illustrated in FIG. 7. The holding instruction table 611 has a configuration in which a field of a rigidity factor of the workpiece W1d serving as workpiece information is added as the rightmost field to the field 6002 of control parameters for the joints J1 to J5 in addition to the content of the holding instruction table 511 of FIG. 7.

As described above, in FIG. 15, the value of 10 N/mm described above is stored in the field of rigidity factor as the rigidity factor of the workpiece W1d to be held in holding control of a holding instruction number 2. In particular, in the holding control of the holding instruction number 2, the joints J1, J3, J4, and J5 are respectively subjected to position control with values of 0 mm, 50 mm, 0 deg, and 0 deg, the joint J2 is subjected to force control with a value of 10 N, and the workpiece W1d is held via outer holding.

Control elements of the hand control apparatus 500 include the correction amount calculation portion 520, the hand instruction value generation portion 530, the motor control portions 541 to 545, and the hand motor driver 505 similarly to the hand control apparatus 500 of the first exemplary embodiment illustrated in FIG. 4. The difference from the first exemplary embodiment is in the correction amount calculation portion 520. The correction amount calculation portion 520 of the second exemplary embodiment uses the rigidity factor of the held workpiece W1d in an arithmetic operation that will be described later in the case where the hand 300 holds the workpiece W1d via force control. The detailed description will be given below.

The correction amount calculation portion 520 is constituted by the correction factor selection portion 521 and the correction amount computation portion 522 similarly to FIG. 9 of the first exemplary embodiment. The correction factor selection portion 521 is similar to the first exemplary embodiment. The correction amount computation portion 522 of the present exemplary embodiment calculates the correction amount of the position of the held workpiece W1d by using correction factors selected by the correction factor selection portion 521, a force instruction value in the holding instruction table 611 or a value of holding force detected by the force sensors 341 to 343, and the rigidity factor of the workpiece W1d.

Holding control for holding the workpiece W1d performed by the hand control apparatus 500 in the present exemplary embodiment will be described. As a precondition, positioning of the workpiece W1d is performed at a center position in a holding direction of the workpiece W1d.

The procedure of performing warp correction by the hand control apparatus 500 described above is similar to FIG. 12 of the first exemplary embodiment. However, the arithmetic operation of step S10 shown in FIG. 12 is different from the first exemplary embodiment, and the arithmetic operation of step S10 will be described below with reference to FIG. 16.

Figure 16:
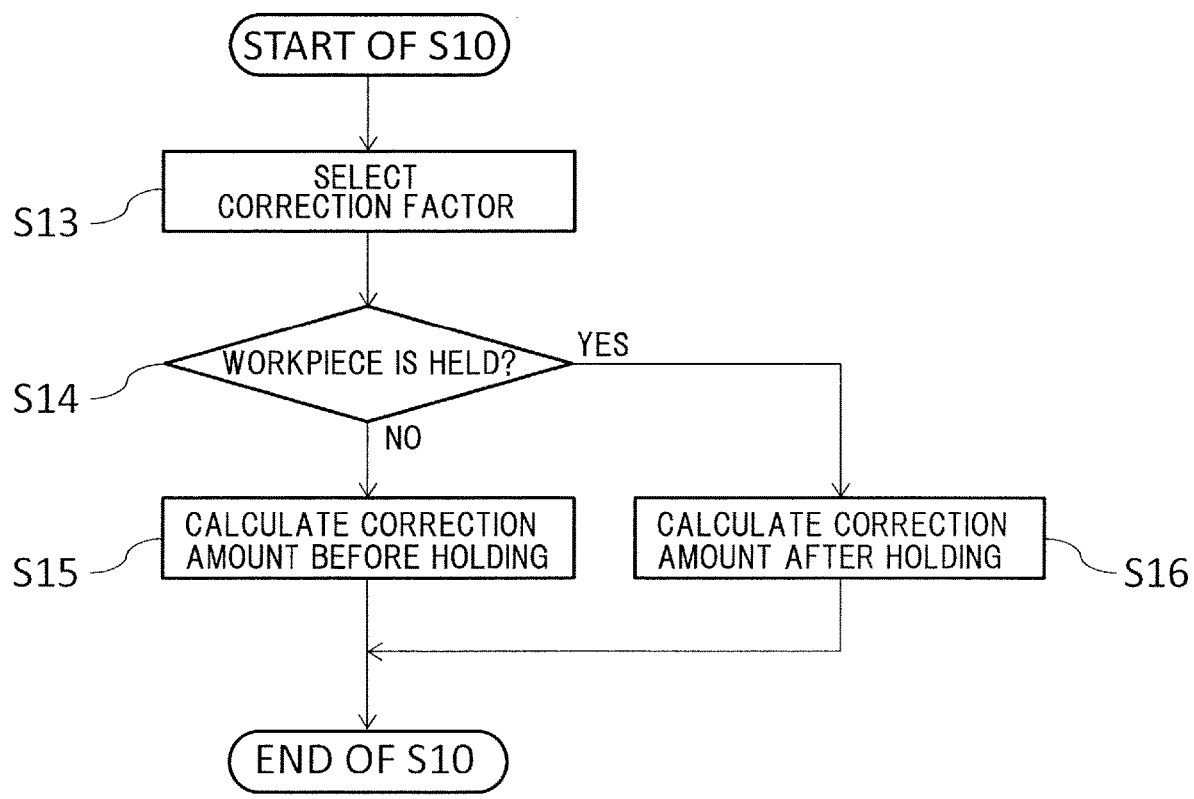
FIG. 16 is a flowchart illustrating a holding control procedure including warp correction according to the second exemplary embodiment of the present invention.

In FIG. 16, in step S13, correction factors are selected by the correction factor selection portion 521 on the basis of the correction factor table 512. For example, in the case of holding the workpiece W1d, values a35 and b35 are selected for the correction factors a3 and b3.

In the case of holding the workpiece W1d by the fingers 3402 and 3403 of the hand 300 as illustrated in FIG. 14, the influence of the rigidity of the workpiece W1d is different between before and after the fingers 3402 and 3403 come into contact with and hold the workpiece W1d.

Accordingly, in the holding control taking the rigidity of workpiece into consideration as in the present exemplary embodiment, whether a holding state in which the fingers 3402 and 3403 are in contact with and holding the workpiece W1d has been established is determined as in step S14. In the case where it is determined that the holding state is not established yet, correction control of position is performed by using the rigidity information. In the case where it is determined that the holding state has been established, correction control of position is performed by using the actual dimension of the workpiece W1d without using the rigidity information.

The determination of whether the holding state of the workpiece W1d has been established in step S14 can be made by, for example, monitoring the output value of the force sensor 342, that is, change in the holding force, by the correction amount computation portion 522. For example, whereas external force is not applied to the force sensor 342 before holding, the force sensor 342 starts outputting detection values corresponding to the external force at the time point at which the fingers 3402 3403 comes into contact with the workpiece W1d. The determination whether the holding state of the workpiece W1d has been established can be made in accordance with this change in the output of the force sensor 342 as described above. However, the determination whether the holding state of the workpiece W1d has been established may be alternatively made in accordance with, for example, change in the driving amount, such as a value of driving current of the motor 312, of the motors 311 to 315 serving as drive sources of fingers or amounts of displacement or a relative amount of displacement of the fingers 3402 and 3403 detected by encoders.

In the case of making determination of whether the holding state of the workpiece W1d has been established in accordance with the change in the output of the force sensor 342 in step S14, the following arithmetic operation is performed. For example, in the case where F2 represents a current detected value of the force sensor 342, step S14 is realized by making such determination as expressed by an inequality of a formula (5).

$$|F_2| < 2\varepsilon \quad (5)$$

In the formula (5) described above, E represents a minimum force resolution of the force sensor 342. In the case where the formula (5) is satisfied, it is determined that the holding state is not established yet, and the process proceeds to step S15. In the case where the formula (5) is not satisfied, it is determined that the holding state has been established, and the process proceeds to step S16.

In the case where the formula (5) has been satisfied in step S14 and the process has proceeded to step S15, the hand 300 is in a state before holding the workpiece W1d. In this case, the correction amount is calculated by the correction amount computation portion 522 from the correction factors a3 and b3 and the rigidity factor of the workpiece W1d and a force instruction value Fref indicating the holding force of the holding instruction table 611. In this case of holding the workpiece W1d, the correction amount is calculated by, for example, the following formula (6).

$$\Delta X_{ref3} = a_{35} F_{ref2} + b_{35} + \frac{F_{ref2}}{2K_w} \quad (6)$$

ΔXref3 represents a correction amount of the finger 3403, Fref2 represents holding force to be generated in the finger 3402, and Kw represents the rigidity factor of the workpiece. A value detected by the force sensor 342 may be also used as Fref2. According to the formula (6) described above, the hand control apparatus 500 or the arm control apparatus 400 can perform position correction in consideration of the warp ΔXref2 of the workpiece W1d. With this configuration, positioning of the workpiece W1d can be performed at a center position in a holding direction in a state immediately before holding.

In contrast, in the case where the formula (5) has not been satisfied in step S14 and thus it has been determined that the holding state has been established and the process has proceeded to step S16, the correction amount is calculated by the correction amount computation portion 522 from the correction factors a3 and b3 and a current output value, in other words, a sensed force value, of the force sensor 342. In this case of holding the workpiece W1d, the correction amount is calculated by, for example, the following formula (7).

$$\Delta X_{ref3} = a_{35} F_2 + b_{35} + \frac{X_2 - X_3}{2} \quad (7)$$

ΔXref3 represents a correction amount of the finger 3403 subjected to position control, F2 represents an output value of the force sensor 342, X2 represents a current value of position information of the finger 3402, and X3 represents a current value of the position information of the finger 3403. The current values X2 and X3 of position information of the fingers 3402 and 3403 can be calculated from, for example, values of the encoders 332 and 333 or reduction ratios of the reduction gears 322 and 323.

According to the formula (7) described above, an actual deviation of width of the workpiece W1d can be estimated as (X2−X3)/2 from the values of the encoders 332 and 333, and the position of the workpiece W1d can be corrected to a position at which the workpiece W1d is supposed to be held. With this configuration, the hand 300 can position the workpiece W1d at the center position in the holding direction of the workpiece W1d while holding the workpiece W1d even in the case where the dimension of the workpiece W1d includes tolerance.

According to the present exemplary embodiment, in the case where, for example, the workpiece W1d is held by a holding force of 10 N and the rigidity factor of a finger driving portion at the fingertip is 50 N/mm, the amount of warp of the fingertip is 10 N/(50 N/mm)=0.2 mm. In addition, in the case where the variation of the dimension of the workpiece W1d in the holding direction is ±0.06 mm, the precision of positioning of the workpiece W1d can be improved by about 0.2 mm+0.06/2 mm=0.23 mm by using the warp correction of the present exemplary embodiment.

As described above, according to the holding control of the present exemplary embodiment, correction calculation for correcting the position of a workpiece can be performed by using the rigidity information of the workpiece. Therefore, even in the case where the workpiece is deformed by the holding force and the dimension of the workpiece is possibly varied, the warp of a finger caused by the holding force can be corrected by correcting the position of a fingertip of a hand, the position of the workpiece can be controlled with a high precision, and thus the precision of positioning of the workpiece can be improved.

The control procedures of warp correction in the first exemplary embodiment and the second exemplary embodiment described above are performed by, for example, the hand control apparatus 500. In addition, the arm body 200 may be also used for driving control of correcting a position.

Accordingly, a recording medium storing a software program that realizes the functions described above may be provided to the hand control apparatus 500, and thereby the functions may be realized by the CPU 501 of the hand control apparatus 500 reading out and executing the program stored in the recording medium. In this case, the program read out from the recording medium itself realizes the functions of the exemplary embodiments described above, and the program itself and the recording medium storing the program constitute the present invention. However, in the case where the arm control apparatus 400 is configured to also control the hand 300, the holding control described above may be performed by the arm control apparatus 400. In this case, a control program for performing the holding control described above may be implemented as part of a control program for the arm control apparatus 400.

In addition, although cases where the ROM 502 or the RAM 503 serves as a computer-readable recording medium and the program is stored in the ROM 502 or the RAM 503 have been described in the exemplary embodiments described above, the present invention is not limited to these exemplary embodiments. The program for implementing the present invention can be stored in any computer-readable recording medium. For example, a hard disk drive: HDD, an external storage device, a recording disk, and so forth may be used as the recording medium for providing the program.

The present invention can be realized via processing that is performed by providing a program that realizes one or more functions of the exemplary embodiments described above to a system or an apparatus via a network or a recording medium and reading out and executing the program by one or more processors of a computer in the system or the apparatus. In addition, the present invention can be realized by a circuit, for example, an application specific integrated circuit: ASIC, that realizes one or more functions.

In addition, although the fingers 3402 and 3403 are caused to pivot independently by the motors 314 and 315 in the first and second exemplary embodiments, the fingers 3402 and 3403 may be driven by a single drive source in a synchronized manner by using an actuator. This exemplary embodiment will be described in detail below.

Figure 17:
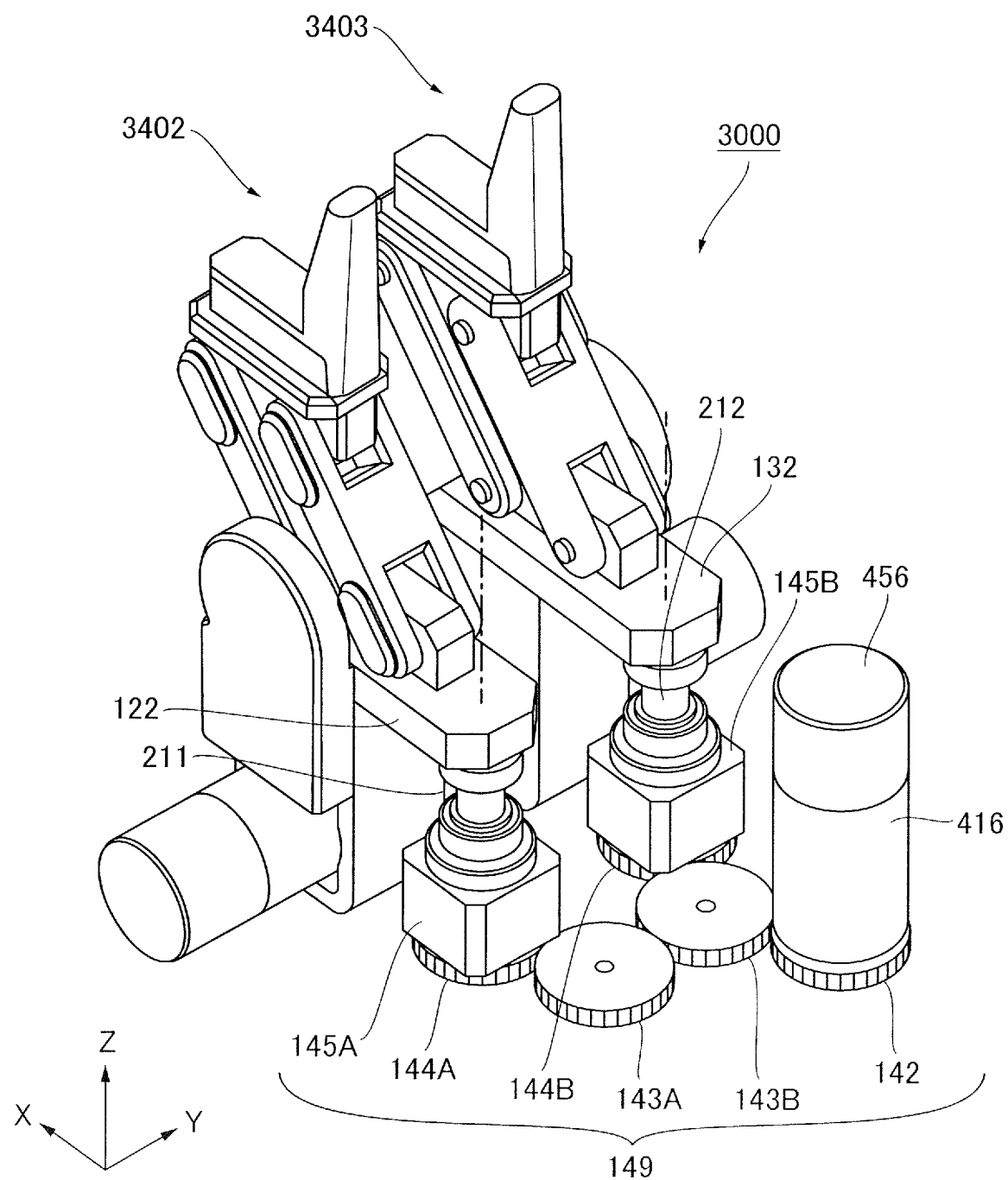
FIG. 17 is an explanatory diagram illustrating a hand of another exemplary embodiment.

FIG. 17 illustrates a schematic configuration of a hand 3000. The hand 3000 includes a motor 416, an encoder 456, and a transmission device 149. The encoder 456 detects a rotation angle of the motor 416, and the transmission device 149 distributes a rotational driving force of the motor 416 among pivot shafts 211 and 212 of the fingers 3402 and 3403.

The hand 3000 also includes plural wave gear reducers 145A and 145B respectively coupled with the pivot shafts 211 and 212 respectively coupled with the fingers 3402 and 3403. The transmission device 149 transmits an output of the motor 416 serving as a rotational drive source to the wave gear reducers 145A and 145B.

The transmission device 149 includes, for example, gears 142, 143A, 143B, 144A, and 144B. The gear 142 is coupled with an output shaft of the motor 416, the gears 144A and 144B are respectively coupled with input shafts of the wave gear reducers 145A and 145B, and the gears 143A and 143B are intermediate gears disposed between the gear 142 and the gears 144A and 144B. Although these gears are spur gears in the present exemplary embodiment, the transmission device 149 may be constituted by, for example, pulleys and belts, and worm gears may be used for part of the gears.

In addition, in the transmission device 149, the rotational drive force of the motor 416 is transmitted from the gear 142 coupled with the output shaft of the motor 416 to the gear 144B coupled with the input shaft of the wave gear reducer 145B via the intermediate gear 143B. In addition, the rotational drive force is transmitted from the intermediate gear 143B to the gear 144A coupled with the input shaft of the wave gear reducer 145A via the intermediate gear 143A. To realize pivoting control of fingers of the present exemplary embodiment, the number of teeth is preferably the same between the intermediate gears 143A and 143B. With this configuration, a gear ratio of the motor 141 to the wave gear reducer 145A and a gear ratio of the motor 141 to the wave gear reducer 145B are the same, and the rotational driving directions thereof are opposite to each other.

In addition, in a pivoting mechanism of fingers of the hand 3000, the wave gear reducers 145A and 145B are disposed for the respective fingers 3402 and 3403 at positions corresponding to a latter part of transmission in the transmission device 149. Therefore, even in the case where there is an error due to a backlash or extension occurring in gears or belts in the transmission device, an error of angle occurring in transmission to the pivot shafts 211 and 212 of the fingers 3402 and 3403 can be reduced greatly. The same applies to a case where chains are used in the transmission device 149. Theoretically, the error of angle occurring in the transmission device 149 in transmission to the pivot shafts 211 and 212 of the fingers 3402 and 3403 can be reduced to 1/reduction ratio of a wave gear reducer.

A configuration in which the two fingers 3402 and 3403 pivoting in the way described above are driven by a single drive source by using an actuator and wave gear reducers are used for transmission shafts of fingers may be also employed.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s) The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-219936, filed on Nov. 10, 2016, and Japanese Patent Application No. 2016-237183, filed on Dec. 7, 2016, which are hereby incorporated by reference herein in their entirety.

What is claimed is:

1. A method of controlling a holding apparatus configured to hold a target object by plural fingers in plural relative postures, the method comprising:
    obtaining, on a basis of a relative posture when holding the target object among the plural relative postures, and a holding force when holding the target object, an amount of movement of the target object by deformation of the fingers when the target object is held; and
    controlling a position of the target object, on a basis of the amount of movement.

2. The method of controlling the holding apparatus according to claim 1, wherein, in the obtaining, the amount of movement is obtained on a basis of a correction factor of the relative posture when holding the target object among correction factors being set for each of the plural relative postures, and the holding force.

3. The method of controlling the holding apparatus according to claim 1, wherein, in the obtaining, the amount of movement is obtained on a basis of amounts of deformation of the fingers, the amounts of deformation of the fingers is obtained on a basis of a correction factor of the relative posture when holding the target object among correction factors being set for each of the plural relative postures, and the holding force.

4. The method of controlling the holding apparatus according to claim 2,
    wherein, in the obtaining, the amount of movement is obtained on a basis of the correction factor of the relative posture when holding the target object, and the holding force, and rigidity information of the target object, the correction factors being stored in a memory for each of the plural relative postures, the rigidity information being stored for plural kinds of target objects.

5. The method of controlling the holding apparatus according to claim 2, wherein, in the obtaining, the amount of movement of the target object is obtained by using a formula based on the correction factor of the relative posture when holding the target object.

6. The method of controlling the holding apparatus according to claim 1,
    wherein the holding apparatus comprises a force sensor configured to detect a force applied to at least one of the fingers, and
    wherein, in the obtaining, the amount of movement is obtained by using a value detected by the force sensor.

7. The method of controlling the holding apparatus according to claim 2, wherein, in the obtaining, the amount of movement is obtained on a basis of the correction factor of the relative posture when holding the target object, and information about a magnitude of the holding force, and information about a direction of the holding force.

8. A holding apparatus configured to hold a target object by plural fingers in plural relative postures, the holding apparatus comprising:
    an obtaining portion configured to obtain, on a basis of a relative posture when holding the target object among the plural relative postures, and a holding force when holding the target object, an amount of movement of the target object by deformation of the fingers when the target object is held; and
    a control portion configured to control, on a basis of the amount of movement, a position of the target object.

9. The holding apparatus according to claim 8, wherein the obtaining portion obtains the amount of movement on a basis of a correction factor of the relative posture when holding the target object among correction factors being set for each of the plural relative postures, and the holding force.

10. The holding apparatus according to claim 8, wherein the obtaining portion obtains the amount of movement on a basis of amounts of deformation of the fingers, the amounts of deformation of the fingers is obtained on a basis of a correction factor of the relative posture when holding the target object among correction factors being set for each of the plural relative postures, and the holding force.

11. The holding apparatus according to claim 9, wherein the obtaining portion obtains the amount of movement on a basis of the correction factor of the relative posture when holding the target object, and the holding force, and rigidity information of the target object, the correction factors being stored in a memory for each of the plural relative postures, the rigidity information being stored for plural kinds of target objects.

12. The holding apparatus according to claim 9, wherein the obtaining portion obtains the amount of movement by using a formula based on the correction factor of the relative posture when holding the target object.

13. The holding apparatus according to claim 8, further comprising:
    a force sensor configured to detect the holding force,
    wherein the obtaining portion obtains, by using a value of the holding force detected by the force sensor, the amount of movement.

14. A robot apparatus comprising:
    a robot arm provided with the holding apparatus according to claim 8,
    wherein the robot is configured to move the target object by an amount, which corresponds to the amount of movement, by controlling a position and/or a posture of the robot arm.

15. A non-transitory computer-readable storage medium, which stores a program that causes a computer to execute the method of controlling the holding apparatus according to claim 1.

16. A method of manufacturing a product, the method comprising:
    providing a work element; and
    holding the work element by the holding apparatus according to claim 8.

* * * * *